(12) United States Patent
Takahashi et al.

(10) Patent No.: US 12,726,977 B2
(45) Date of Patent: Sep. 1, 2026

(54) TERMINAL, RADIO COMMUNICATION METHOD, BASE STATION, AND SYSTEM THAT ENABLE UL TRANSMISSIONS FOR WHICH THE PRIORITY SETTING IS SUPPORTED TO BE APPROPRIATELY CONTROLLED

(71) Applicant: NTT DOCOMO, INC., Tokyo (JP)

(72) Inventors: Yuki Takahashi, Tokyo (JP); Satoshi Nagata, Tokyo (JP); Jing Wang, Beijing (CN); Lan Chen, Beijing (CN); Jialin Wu, Beijing (CN); Yong Li, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 362 days.

(21) Appl. No.: 18/245,465

(22) PCT Filed: Sep. 16, 2020

(86) PCT No.: PCT/JP2020/035159
§ 371 (c)(1),
(2) Date: Mar. 15, 2023

(87) PCT Pub. No.: WO2022/059110
PCT Pub. Date: Mar. 24, 2022

(65) Prior Publication Data

US 2023/0345472 A1 Oct. 26, 2023

(51) Int. Cl.

| | |
|---|---|
| ***H04W 72/00*** | (2023.01) |
| ***H04W 72/1268*** | (2023.01) |
| ***H04W 72/566*** | (2023.01) |

(52) U.S. Cl.
CPC ..... *H04W 72/1268* (2013.01); *H04W 72/566* (2023.01)

(58) Field of Classification Search
CPC ........... H04W 72/1268; H04W 72/566; H04W 72/21; H04L 1/0031; H04L 1/1614; H04L 1/1671; H04L 5/0053; H04L 5/0094; H04L 1/1854
See application file for complete search history.

(56) References Cited

U.S. PATENT DOCUMENTS

| | | | | |
|---|---|---|---|---|
| 12,022,468 | B2 * | 6/2024 | Yoshioka | H04W 72/1268 |
| 12,041,648 | B2 * | 7/2024 | Lee | H04L 5/1469 |
| 2022/0279561 | A1 * | 9/2022 | Marinier | H04L 1/1854 |

OTHER PUBLICATIONS

Office Action issued in Japanese Application No. 2022-550108, mailed Nov. 26, 2024 (6 pages).

(Continued)

*Primary Examiner* — Pakee Fang
(74) *Attorney, Agent, or Firm* — Osha Bergman Watanabe & Burton LLP

(57) ABSTRACT

A terminal according to an aspect of the present disclosure includes: a control section that, in a case where a first uplink channel and a plurality of second uplink channels having a lower priority than the first uplink channel and not overlapping in a time domain are overlapping, performs control to map at least one of uplink control information corresponding to each of the plurality of second uplink channels to the first uplink channel; and a transmitting section that uses the first uplink channel to transmit at least one of the uplink control information corresponding to each of the plurality of second uplink channels.

5 Claims, 19 Drawing Sheets

(56) References Cited

OTHER PUBLICATIONS

Moderator (OPPO): "Summary#1 of email thread [102-e-NR-IIOT_URLLC_enh-04]"; 3GPP TSG RAN WG1 #102-e, R1-2007075; e-Meeting, Aug. 17-28, 2020 (16 pages).
Office Action in Japanese Application No. 2022-550108, dated Jun. 18, 2024 (10 pages).
Office Action in Chinese Application No. 202080107219.5, dated Jul. 10, 2024 (12 pages).
3GPP TSG RAN WG1 #102-e; R1-2007075; Moderator (OPPO); "Summary#1 of email thread [102-e-NR-IIOT_URLLC_enh-04]"; e-Meeting, Aug. 17-28, 2020 (15 pages).
3GPP TSG RAN WG1 Meeting #102-e; R1-2006340; Nokia, Nokia Shanghai Bell; "On Rel-17 UL intra-UE prioritization and multiplexing enhancements of traffic with different priorities"; e-Meeting, Aug. 17-28, 2020 (12 pages).
Office Action issued in Chinese Application No. 202080107219.5; mailed Mar. 19, 2025 (11 pages).
International Search Report issued in PCT/JP2020/035159 on Mar. 23, 2021 (6 pages).
Written Opinion of the International Searching Authority issued in PCT/JP2020/035159 on Mar. 23, 2021 (4 pages).
NEC; "Discussion on Intra-UE prioritization and multiplexing"; 3GPP TSG RAN WG1 #102-e, R1-2005777; e-Meeting; Aug. 17-28, 2020 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

UL CHANNEL(HARQ-ACK)_H
UL CHANNEL(PUSCH)_H
TIME
MULTIPLEXING
UL CHANNEL(HARQ-ACK)_H
TIME

UL CHANNEL(data/UCI)_H
UL CHANNEL(data/UCI)_L
TIME
PRIORITY
UL CHANNEL(data/UCI)_H
DROP
TIME

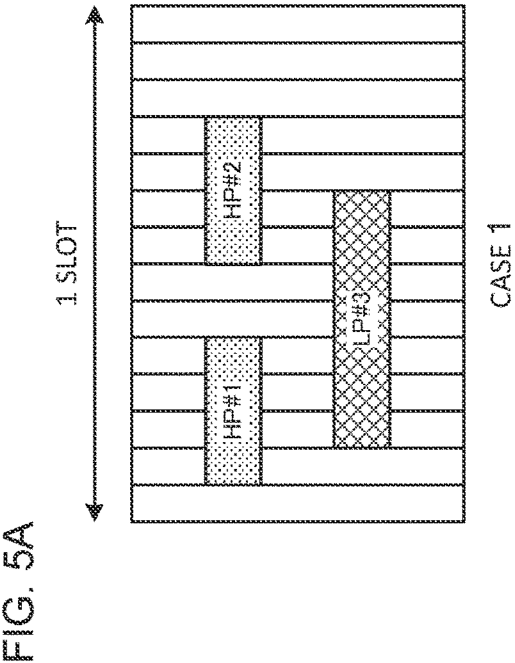
FIG. 5A
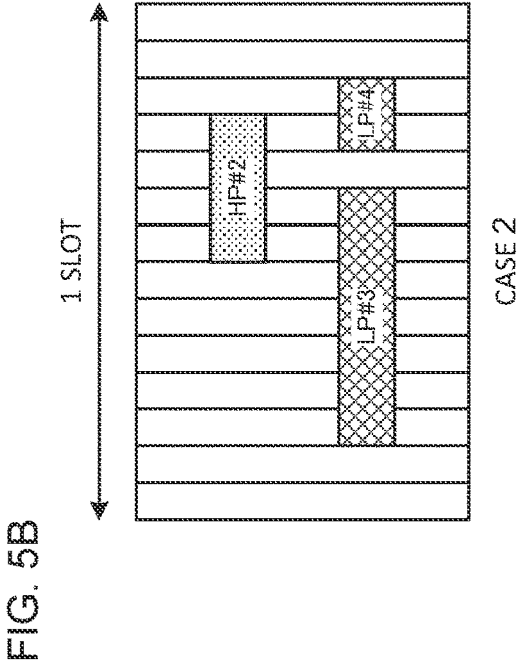
FIG. 5B
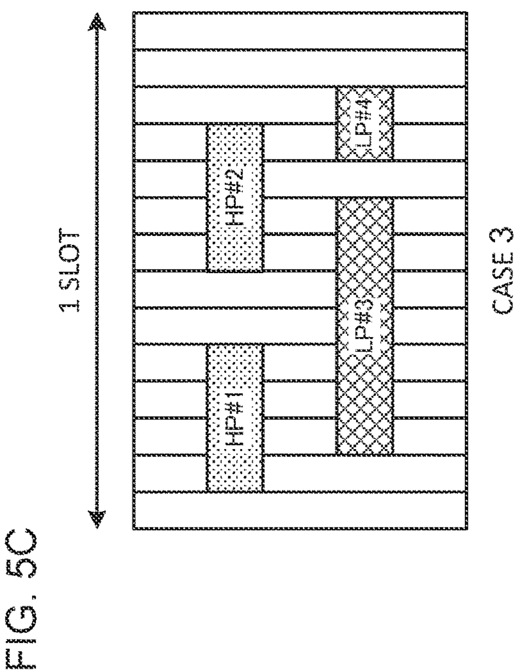
FIG. 5C
FIG. 5D

1 SLOT
HP#1
HP#2
LP#3
LP#4

1 SLOT
HP#1
HP#2
LP#3
LP#4

1 SLOT
HP#1
HP#2
LP#3
LP#4

TERMINAL, RADIO COMMUNICATION METHOD, BASE STATION, AND SYSTEM THAT ENABLE UL TRANSMISSIONS FOR WHICH THE PRIORITY SETTING IS SUPPORTED TO BE APPROPRIATELY CONTROLLED

TECHNICAL FIELD

The present disclosure relates to a terminal, a radio communication method, and a base station in next-generation mobile communication systems.

BACKGROUND ART

In a Universal Mobile Telecommunications System (UMTS) network, specifications of Long-Term Evolution (LTE) have been drafted for the purpose of further increasing data rates, providing low latency, and so on (Non Patent Literature 1). In addition, specifications of LTE-Advanced (3GPP Releases (Rel.) 10 to 14) have been drafted for the purpose of further increasing capacity and advancing LTE (Third Generation Partnership Project (3GPP) Rel. 8 and 9).

Successor systems to LTE (for example, also referred to as the 5th generation mobile communication system (5G), 5G+ (plus), New Radio (NR), or 3GPP Rel. 15 and subsequent releases) are also under study.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010.

SUMMARY OF INVENTION

Technical Problem

Future radio communication systems (such as 5G or NR, for example) are expected to involve a plurality of services (also referred to as use cases, communication types, and/or the like) having different communication requirements such as higher speed and larger capacity (for example, enhanced Mobile Broad Band (eMBB)), a massive amount of terminals (for example, massive machine type communication (mMTC) or Internet of Things (IoT)), and ultra-high reliability and low latency (for example, Ultra-Reliable and Low-Latency Communications (URLLC)).

A study is underway in which, in Rel. 16 and subsequent releases, priorities are configured for signals/channels, and communication is controlled based on the priorities set for each signal/channel. For example, in a case where a plurality of signals/channels are overlapping, it is assumed that transmission/reception is controlled on the basis of the priority of each signal/channel.

However, even when a plurality of UL transmissions having different priorities are overlapping in the time domain, allowing the plurality of UL transmissions may be considered, depending on the communication environment/communication condition/UE capability. However, how to control UL transmissions in such a case has not been sufficiently studied.

Therefore, an object of the present disclosure is to provide a terminal, a radio communication method, and a base station that enable one or more UL transmissions for which the priority setting is supported to be appropriately controlled.

Solution to Problem

A terminal according to an aspect of the present disclosure includes: a control section that, in a case where a first uplink channel and a plurality of second uplink channels having a lower priority than the first uplink channel and not overlapping in a time domain are overlapping, performs control to map at least one of uplink control information corresponding to each of the plurality of second uplink channels to the first uplink channel; and a transmitting section that uses the first uplink channel to transmit at least one of the uplink control information corresponding to each of the plurality of second uplink channels.

Advantageous Effects of Invention

According to one aspect of the present disclosure, one or more UL transmissions for which the priority setting is supported can be appropriately controlled.

BRIEF DESCRIPTION OF DRAWINGS

FIGS. 5A to 5D are diagrams illustrating an example of a case where a certain UL channel is overlapping a plurality of UL channels having different priorities.

DESCRIPTION OF EMBODIMENTS

<Traffic Type>

Figures 1A, 1B:
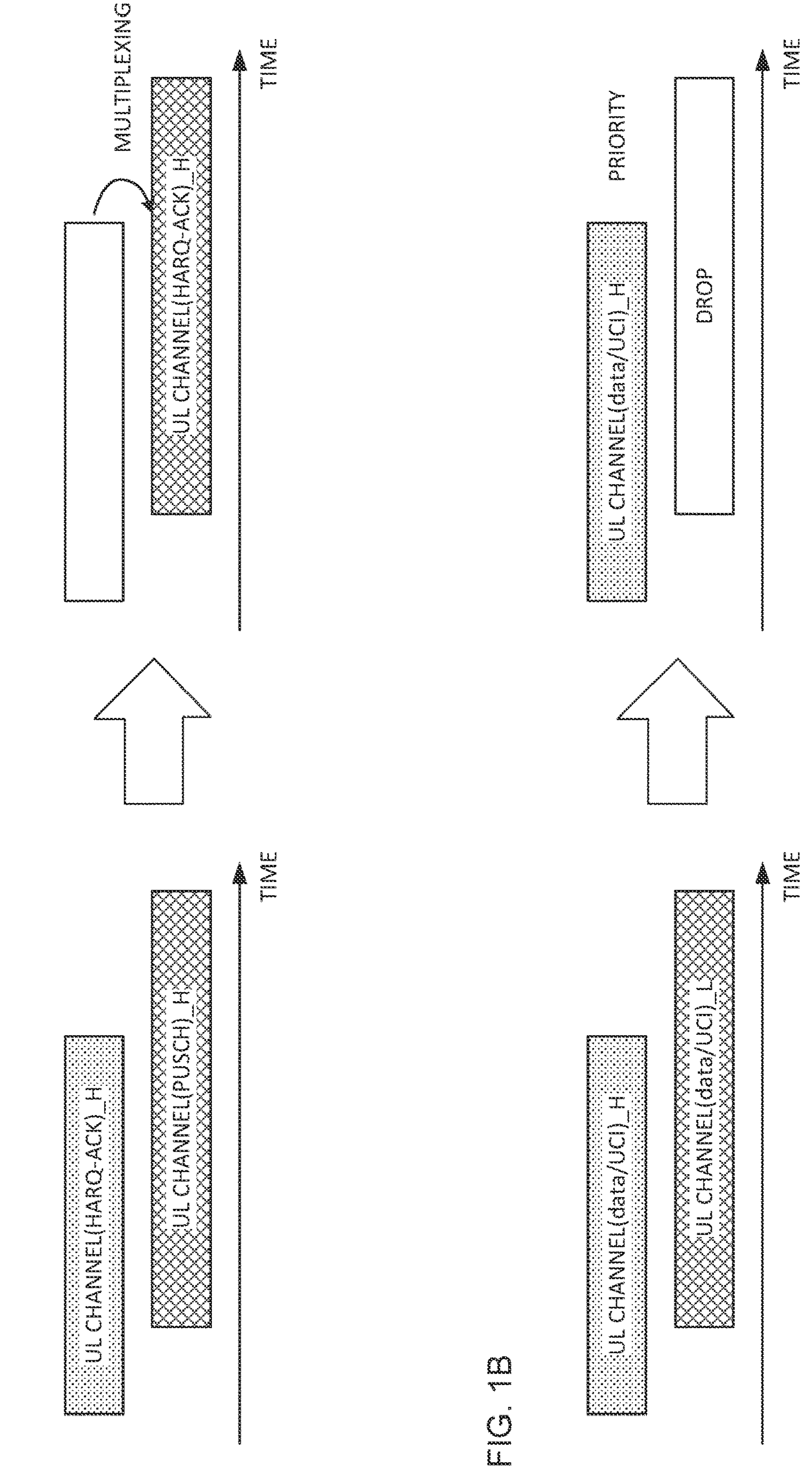
FIGS. 1A and 1B are diagrams illustrating an example of priority-based UL transmission control.

Future radio communication systems (for example, NR) are expected to involve traffic types (also referred to as services, service types, communication types, use cases, and the like) such as enhanced mobile broadband (for example, Mobile Broadband (eMBB)), machine-type communications that embody multiple simultaneous connections (for example, massive Machine Type Communications (mMTC), and Internet of Things (IoT)), and highly reliable and low-latency communications (for example, Ultra-Reliable and Low-Latency Communications (URLLC)). For example, in the case of URLLC, a smaller latency and a higher reliability than eMBB are required.

The traffic type may be identified in a physical layer on the basis of at least one of the following:

- Logical channels having different priorities
- Modulation and Coding Scheme (MCS) table (MCS index table)
- Channel Quality Indication (CQI) table
- DCI format
- System Information-Radio Network Temporary Identifier (RNTI) used for scrambling (masking) of Cyclic Redundancy Check (CRC) bit included in (added to) DCI (DCI format)
- Radio Resource Control (RRC) parameter
- Specific RNTI (for example, RNTI for URLLC, MCS-C-RNTI, or the like)
- Search space
- Given field in DCI (for example, newly added field or reuse of existing field)

Specifically, a HARQ-ACK traffic type for a PDSCH may be determined on the basis of at least one of the following:

- MCS index table used to determine at least one of the modulation order, target code rate, and Transport Block Size (TBS) of the PDSCH (for example, whether to use MCS index table 3)
- RNTI used for CRC scrambling of DCI used for scheduling the PDSCH (for example, whether CRC scrambled with C-RNTI or MCS-C-RNTI)

Further, an SR traffic type may be determined on the basis of a higher layer parameter used as an SR identifier (SR-ID). The higher layer parameter may indicate whether the SR traffic type is eMBB or URLLC.

A CSI traffic type may also be determined on the basis of configuration information related to CSI reports (CSIreportSetting), a DCI type used for triggering, or a DCI transmission parameter, or the like. The configuration information, the DCI type, or the like may indicate whether the traffic type of the CSI is either eMBB or URLLC. Further, the configuration information may be a higher layer parameter.

A PUSCH traffic type may also be determined on the basis of at least one of the following.

- MCS index table used to determine at least one of the modulation order, target code rate, and transport block size (TBS) of the PUSCH (for example, whether or not to use MCS index table 3).
- RNTI used for CRC scrambling of the DCI used for scheduling the PUSCH (for example, whether the CRC is scrambled with C-RNTI or MCS-C-RNTI)

A traffic type may be associated with communication requirements (requirements and required conditions such as latency and error rate), and a data type (voice, data, etc), or the like.

The difference between URLLC requirements and eMBB requirements may be that URLLC latency is lower than eMBB latency or that URLLC requirements include reliability requirements.

For example, eMBB user (U)-plane latency requirements may include that downlink U-plane latency is 4 ms and that uplink U-plane latency is 4 ms. Meanwhile, URLLC U-plane latency requirements may include that the downlink U-plane latency is 0.5 ms and that the uplink U-plane latency is 0.5 ms. Furthermore, the URLLC reliability requirements may include that a 32-byte error rate is $10^{-5}$ for a U-plane latency of 1 ms.

Furthermore, enhancement of the reliability of traffic for unicast data is mainly studied as enhanced Ultra Reliable and Low Latency Communications (eURLLC). Hereinafter, in a case where no distinction is made between URLLC and eURLLC, they are simply referred to as URLLC.

<Priority Configuration>

For NR for Rel. 16 and subsequent releases, setting priorities at a plurality of levels (for example, two levels) for a predetermined signal or channel is being studied. For example, it is assumed that communication is controlled (for example, transmission control at the time of collision, and the like) by configuring different priorities for every signal or channel each corresponding to different traffic types (also referred to as "services," "service types," "communication types," "use cases," and the like). By this means, it is possible to control communication by configuring, for the same signal or channel, different priorities according to the service type or the like.

The priority may be set for at least one of a signal (for example, UCI such as HARQ-ACK, a reference signal, and the like), a channel (PDSCH, PUSCH, PUCCH, and the like), a reference signal (for example, channel state information (CSI), a sounding reference signal (SRS), and the like), a scheduling request (SR), and a HARQ-ACK codebook. In addition, priorities may be respectively set for a PUCCH used for SR transmission, a PUCCH used for HARQ-ACK transmission, and a PUCCH used for CSI transmission.

The priorities may be defined by a first priority (for example, high) and a second priority (for example, low) that is lower than the first priority. Alternatively, three or more types of priorities may be configured.

For example, priorities may be configured for HARQ-ACK for PDSCH that is dynamically scheduled, HARQ-ACK for semi-persistent PDSCH (SPS PDSCH), and HARQ-ACK for SPS PDSCH release. Alternatively, priorities may be configured for HARQ-ACK codebooks corresponding to these HARQ-ACKs. Note that, in a case where a priority is configured for a PDSCH, priority of the PDSCH is interchangeable with priority of the HARQ-ACK for the PDSCH.

In addition, priorities may be configured for a dynamic grant-based PUSCH, a configured grant-based PUSCH, or the like.

Notification of the information about the priority may be sent from the base station to a UE by using at least one of higher layer signaling and DCI. For example, the priority of the scheduling request may be configured by a higher layer parameter (for example, schedulingRequestPriority). The priority of the HARQ-ACK for the PDSCH (for example, dynamic PDSCH) scheduled by the DCI may be notified by the DCI. The priority of the HARQ-ACK for the SPS PDSCH may be configured by a higher level parameter (for example, HARQ-ACK-Codebook-indicator-forSPS), or may be notified by DCI instructing activation of the SPS PDSCH. A predetermined priority (for example, low) may be configured for P-CSI/SP-CSI transmitted by the PUCCH. Meanwhile, the priority of A-CSI/SP-CSI transmitted by the PUSCH may be reported using DCI (for example, the trigger DCI or the activation DCI).

The priority of the dynamic grant-based PUSCH may be notified using DCI for scheduling the PUSCH. The priority of the configured grant-based PUSCH may be configured using a higher layer parameter (for example, priority). A predetermined priority (for example, low) may be configured for the P-SRS/SP-SRS and A-SRS triggered by DCI (for example, DCI format 0_1/DCI format 2_3).

(Overlap of UL Transmission)

The UE may control UL transmissions based on priorities in a case of overlap (or collision) between a plurality of UL signals/UL channels.

The overlap between a plurality of UL signals/UL channels may be a case where time resources (or time resources and frequency resources) of the plurality of UL signals/UL channels are overlapping or a case where the transmission timings of the plurality of UL signals/UL channels are overlapping. Time resource is interchangeable with time domain. The time resource may be in units of symbols, slots, subslots, or subframes.

A plurality of UL signals/UL channels that are overlapping in the same UE (for example, intra-UE) may mean that the plurality of UL signals/UL channels are overlapping at least in the same time resource (for example, symbol). Further, UL signals/UL channels colliding in different UEs (for example, inter-UE) may mean that a plurality of UL signals/UL channels are overlapping in the same time resource (for example, symbol) and frequency resource (for example, RB).

For example, when a plurality of UL signals/UL channels having the same priority are overlapping, the UE performs control to multiplex the plurality of UL signals/UL channels to one UL channel and transmit the UL signals/UL channels (see FIG. 1A).

FIG. 1A illustrates a case of overlap between a HARQ-ACK (or PUCCH for HARQ-ACK transmission) for which a first priority (high) is configured, and UL data/UL-SCH (alternatively, PUSCH for UL data/UL-SCH transmission) for which the first priority (high) is configured. In this case, the UE multiplexes (or maps) the HARQ-ACK to the PUSCH and transmits both UL data and the HARQ-ACK.

When a plurality of UL signals/UL channels having different priorities are overlapping, the UE may perform control such that a UL transmission having a high priority is performed (for example, the UL transmission having the high priority is prioritized) and a UL transmission having a low priority is not performed (is, for example, dropped) (see FIG. 1B).

FIG. 1B illustrates a case of overlap between a UL data/HARQ-ACK (or a UL channel for UL data/HARQ-ACK transmission) for which a first priority (high) is configured, and a UL data/HARQ-ACK (or a UL channel for UL data/HARQ-ACK transmission) for which a second priority (low) is configured. In this case, the UE performs control to drop the UL data/HARQ-ACK having the low priority and to prioritize and transmit the UL data/HARQ-ACK having the high priority. Note that the UE may change (for example, defer or shift) the transmission timing of the UL transmission having the low priority.

Figure 2:
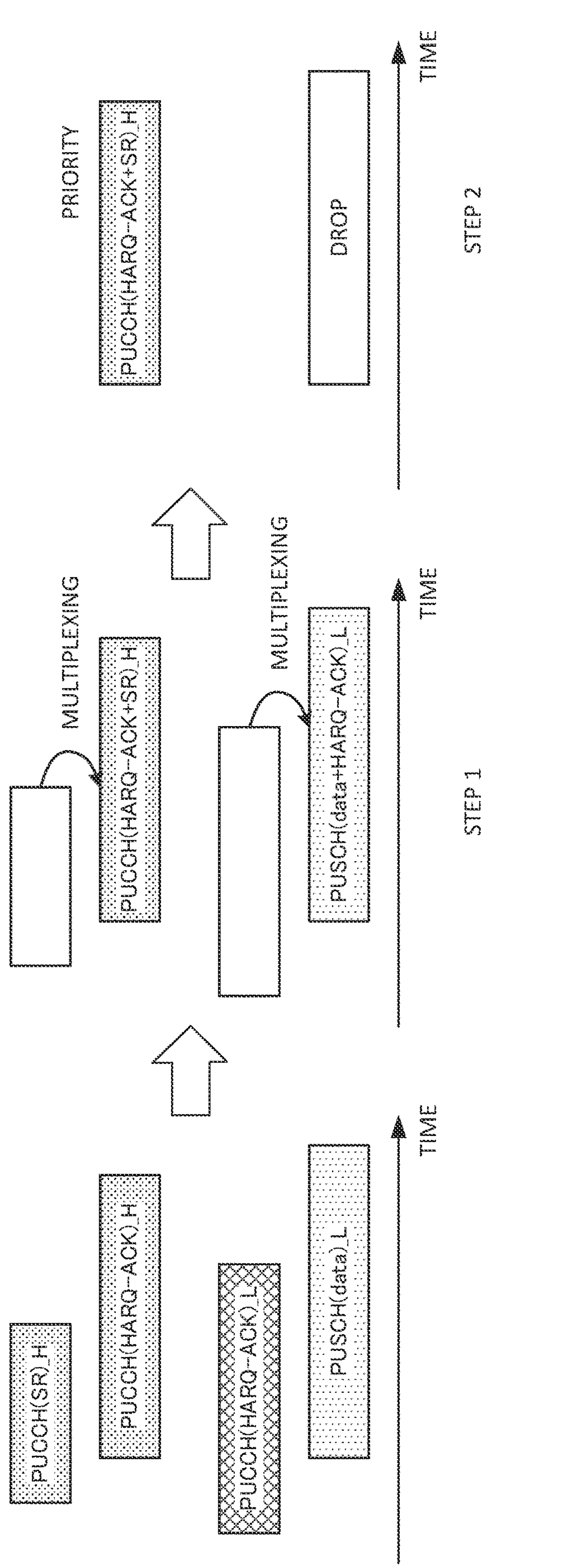
FIG. 2 is diagram illustrating another example of priority-based UL transmission control.

If more than two (or three or more) UL signals/UL channels are overlapping in the time domain, the transmission may be controlled using two steps (see FIG. 2).

In step 1, one UL channel for multiplexing UL signals that are respectively transmitted in UL transmissions having the same priority is selected. In FIG. 2, an SR (or PUCCH for SR transmission) having a first priority (high) and a HARQ-ACK (or PUCCH for HARQ-ACK transmission) may be multiplexed into a predetermined UL channel (here, the PUCCH for HARQ-ACK transmission). Similarly, HARQ-ACK (or PUCCH for HARQ-ACK transmission) having a second priority (low) and data (or PUSCH for data/UL-SCH transmission) may be multiplexed into a predetermined UL channel (here, a PUSCH).

In step 2, control may be performed such, between UL transmissions having different priorities, the UL transmission having a high priority is prioritized and transmitted and the UL transmission having a low priority is dropped. In FIG. 2, the SR having the first priority (high) and the PUCCH for HARQ-ACK transmission may be prioritized and transmitted, and the HARQ-ACK having the second priority (low) and the PUSCH for data transmission may be dropped.

In this way, the UE can resolve collisions between a plurality of UL transmissions having the same priority according to step 1, and resolve collisions between a plurality of UL transmissions having different priorities according to step 2.

(Multiple HARQ-ACK Codebook)

In Rel. 16 and subsequent releases, configuring a maximum of N HARQ-ACK codebooks in a predetermined slot (for example, one slot) may be allowed. For example, N may be 2. For example, when N is 2, the UE may configure, in a predetermined slot, two codebooks for HARQ-ACK (or codebooks corresponding to different priorities/different service types) having different priorities, and feedback the codebooks.

Figure 3:
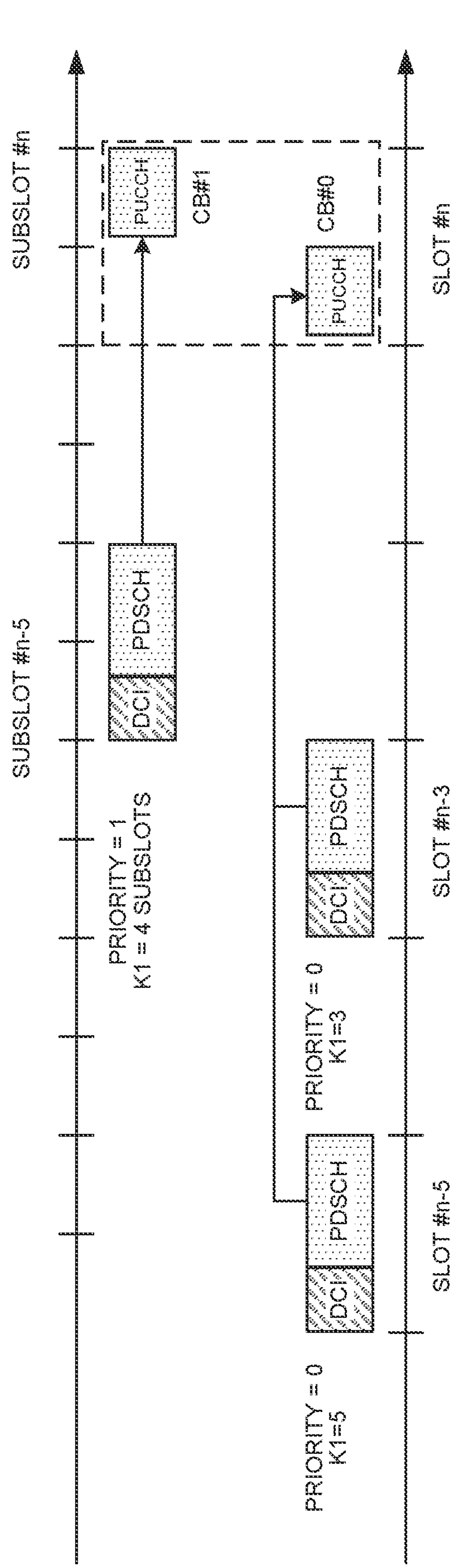
FIG. 3 is a diagram illustrating an example of a case where a plurality of HARQ-ACK codebooks are transmitted in predetermined slots.

The UE may control the generation of a HARQ-ACK codebook (for example, the generation of HARQ-ACK bits in a HARQ-ACK codebook), based on the value of a priority notification field (for example, a Priority Indicator field) contained in the DCI corresponding to each PDSCH. FIG. 3 illustrates an example of a case of generating/feeding back two HARQ-ACK codebooks (here, CB #0 and CB #1) corresponding to different priorities in a slot #n. CB #0 corresponds to a second priority (low) or eMBB, and CB #1 corresponds to a first priority (high) or URLLC.

In FIG. 3, the DCI corresponding to the PDSCH transmitted in slot #n−5 notifies that the feedback timing of the HARQ-ACK is slot #n (K1=5) and that the priority is the second priority (low). The DCI corresponding to the PDSCH transmitted in slot #n−3 notifies that the feedback timing of the HARQ-ACK is slot #n (K1=3) and that the priority is the second priority (low).

In FIG. 3, the DCI corresponding to the PDSCH transmitted in slot #n−2 (subslots #n−4, #n−5) notifies that the feedback timing of the HARQ-ACK is slot #n (subslot #n) (K1=5 subslot) and that the priority is the first priority (high).

In this case, the UE may generate and feed back two HARQ-ACK codebooks (CB #0 and CB #1) in the slot #n.

Figure 4:
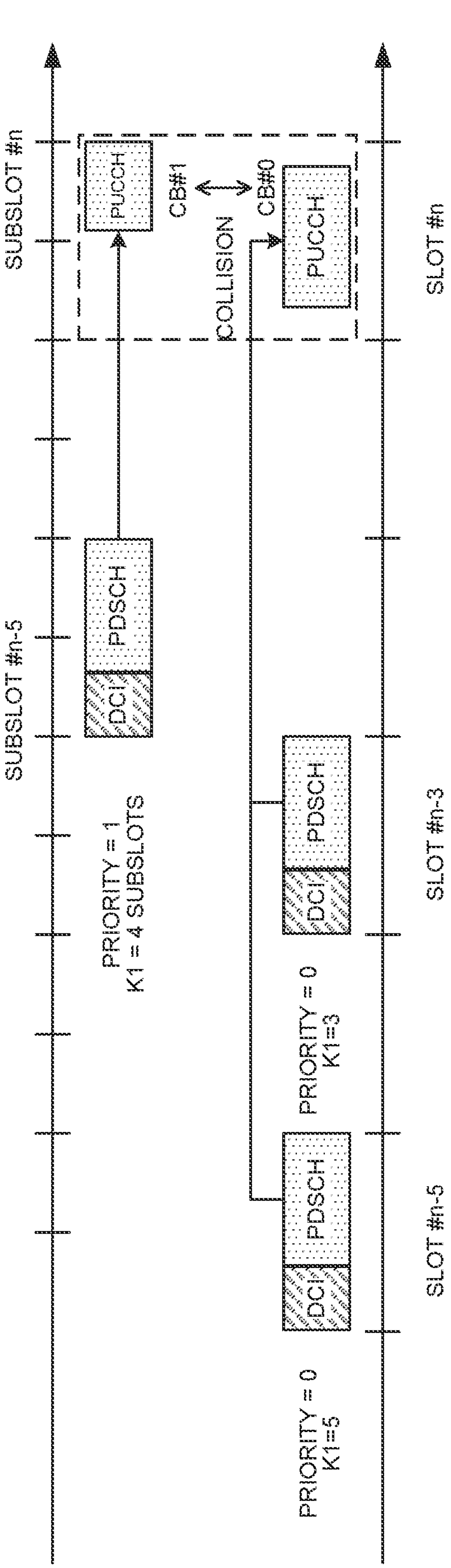
FIG. 4 is a diagram illustrating an example of a case of overlap in the time domain between a plurality of HARQ-ACK codebooks.

Meanwhile, a case may also be considered where the UL resource (for example, PUCCH/PUSCH) for CB #0 and the UL resource for CB #1 are overlapping in the time domain (see FIG. 4). In such a case, controlling the transmission of the HARQ-ACK on the basis of the priority corresponding to the HARQ-ACK (or CB) may be considered. Specifically, a CB having a high priority is transmitted, and a CB having a low priority is dropped.

A study is underway in which, when a plurality of UL transmissions are overlapping in the time domain in this manner, the UE performs control to transmit only UL transmissions (or UL channels/UL signals) having a high priority.

Meanwhile, even when a plurality of UL transmissions having different priorities are overlapping in the time domain, it is considered that the plurality of UL transmissions are permitted according to the communication environment/communication condition/UE capability. The support of the plurality of UL transmissions is useful from the viewpoint of lower latency and spectral efficiency.

The communication environment/communication condition/UE capability may be a cell in which a plurality of UL transmissions are respectively transmitted, a transmission processing/reception processing capability supported by the UE (for example, an RF circuit or the like included in the UE). For example, in a case where a plurality of UL transmissions having different priorities are scheduled within a cell (intra-cell) or between cells (inter-cell) supported by different RFs, the plurality of UL transmissions (for example, simultaneous transmission) may be supported.

However, when transmission of a plurality of UL transmissions having different priorities is supported/allowed, how to control the UL transmissions becomes a problem.

For example, as illustrated in the following cases 1 to 4, a case of overlap, in the time domain, between a certain UL channel and a plurality of UL channels having different priorities from the UL channel, is also assumed. Cases 1 to 4 may indicate a state after step 1 in FIG. 2 (for example, cases 1 to 3) or a state before step 1 (for example, case 4).

<Case 1>

Case 1 corresponds to a case of overlap between a plurality of UL channels HP #1 and HP #2 corresponding to a first priority (for example, high) and a UL channel LP #3 corresponding to a second priority (for example, low) lower than the first priority (see FIG. 5A). A case of a plurality of UL channels HP #1 and HP #2 having a first priority that are not overlapping in the time domain is assumed.

<Case 2>

Case 2 corresponds to a case of overlap between a plurality of UL channels HP #2 corresponding to a first priority (for example, high) and a plurality of UL channels LP #3 and LP #4 corresponding to a second priority (for example, low) (see FIG. 5B). A case of a plurality of UL channels LP #3 and LP #4 having a second priority that are not overlapping in the time domain is assumed.

<Case 3>

Case 3 corresponds to a case of overlap between a plurality of UL channels HP #1 and HP #2 corresponding to a first priority (for example, high) and a UL channel LP #3 corresponding to a second priority (for example, low). This also corresponds to a case of overlap between a UL channel HP #2 corresponding to a first priority (for example, high) and another UL channel LP #4 corresponding to a second priority (for example, low). (See FIG. 5C). A case of a plurality of UL channels HP #1 and HP #2 having a first priority that are not overlapping in the time domain is assumed. Further, a case of a plurality of UL channels LP #3 and LP #4 having a second priority that are not overlapping in the time domain is assumed.

<Case 4>

Case 4 corresponds to a case of overlap between a plurality of UL channels HP #1 and HP #2 corresponding to a first priority (for example, high) and a UL channel LP #3 corresponding to a second priority (for example, low). This also corresponds to a case of overlap between a UL channel LP #3 corresponding to a second priority (for example, high) and another UL channel LP #4 corresponding to a second priority (for example, low). (See FIG. 5D). A case of a plurality of UL channels HP #1 and HP #2 having a first priority that are not overlapping in the time domain is assumed. In addition, a case of a plurality of other UL channels LP #4 having a second priority not overlapping, in the time domain, a plurality of UL channels HP #1 and HP #2 having a first priority is assumed. Note that case 4 may include a case in which only either one of the UL channels HP #1 and HP #2 is configured.

Rel. 16 supports transmission, in a slot, of a plurality of UL channels (for example, PUCCH) having the same priority that are not overlapping. In this case, when UL channels having different priorities are overlapping, a UL channel having a low priority (or UCI/UL data having a (corresponding) second priority allocated to the UL channel) is dropped.

Figure 6:
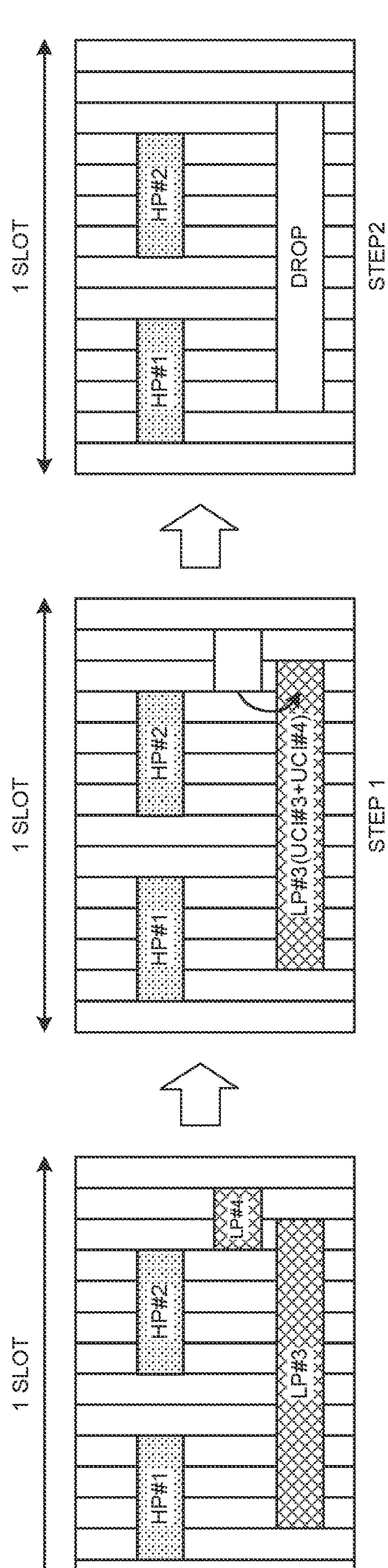
FIG. 6 is a diagram illustrating an example of UL transmission control based on Rel. 16 rules.

For example, for Case 4 (FIG. 5D), when Rel. 16 collision handling is applied, one of UCI #3 corresponding to the UL channel LP #3 and UCI #4 corresponding to the UL channel LP #4 having the same priority is first multiplexed into the other UL channel in step 1 (see FIG. 6). Here, a case where the UCI #4 is multiplexed into a second UL channel LP #3 is illustrated. Thereafter, in step 2, because the UL channel LP #3 having the second priority (low) is overlapping the UL channel HP #1 (or HP #2) having the first priority (high), the UL channel LP #3 is dropped. In this case, the UL channel LP #4 not overlapping the UL channels HP #1 and HP #2 having the first priority (high) is also dropped at the stage before step 1.

In Rel. 17 and subsequent releases, in cases 1 to 4, even when a plurality of UL transmissions having different priorities are overlapping in the time domain, it is assumed that the transmission of UL transmissions having different priorities (for example, UCI, data, and the like) is supported/allowed. However, in such a case, how to control the UL transmissions becomes a problem.

Alternatively, in case 4, performing control, before applying collision handling, to prevent dropping a UL transmission having a second priority (for example, LP #4) that is not overlapping the UL transmission having the first priority, may also be considered. However, in such a case, how to control the UL transmissions becomes a problem.

The present inventors have focused on the fact that a case of overlap, in the time domain, arises between a plurality of UL channels that are not overlapping in the time domain and another UL channels having a different priority, and have studied UL transmission control in such a case to conceive of an aspect of the present embodiment.

Alternatively, the present inventors have focused on a case (for example, Case 4) where, for a plurality of UL channels (for example, LP #3 and LP #4) overlapping in the time domain, a UL channel (for example, LP #1) having a higher priority than the plurality of UL channels is overlapping only either one of the plurality of UL channels, and have conceived of one aspect of the present embodiment by examining UL transmission control in such a case.

Hereinafter, embodiments according to the present disclosure will be described in detail with reference to the drawings. The configurations described in each of the aspects may be applied singly or may be applied in combination with each other.

Furthermore, in the present disclosure, "A/B" is interchangeable with "A and/or B" and "A/B/C" is interchangeable with "at least one of A, B, and C."

In the following description, two levels, namely, a first priority (high) and a second priority (low) will be described as examples of priorities in UL transmission; however, the priorities are not limited to two levels. Priorities at three or more levels may also be configured.

In the present disclosure, UL transmission, UL channel, and UL signal are interchangeable. In the present disclosure, carrier, cell, CC, BWP, and band are interchangeable. Furthermore, in the present disclosure, "transmitted" is interchangeable with "scheduled", "configured", or "allocated".

Furthermore, in the present disclosure, time domain is interchangeable with time domain, time resource, or symbol. Further, in the present disclosure, overlap is interchangeable with "collision" or "overlapping" in the time direction. In addition, in the present disclosure, "dropping" is interchangeable with "puncturing" or "cancellation".

(First Aspect)

In a first aspect, an example of UL transmission control in a case (for example, Case 1) where a UL channel having a second priority (for example, low) is overlapping, in the time domain, a plurality of UL channels having a first priority (for example, high) will be described. A case of a plurality of UL channels having a first priority that are not overlapping in the time domain is assumed.

In the present disclosure, a UL channel having a first priority may refer to a UL channel corresponding to a first-priority UCI, or may refer to a UL channel used for allocation/mapping/transmission of the first-priority UCI. The first-priority UCI may be UCI for which the first priority is configured/designated/defined. A UL channel having a second priority may refer to a UL channel corresponding to a second-priority UCI, or may refer to a UL channel used for allocation/mapping/transmission of the second-priority UCI. The second-priority UCI may be UCI for which the second priority is configured/designated/defined.

In the present embodiment, a case where the plurality of first UL channels and the second UL channel are each an uplink control channel (PUCCH) is taken as an example, but the present invention is not limited thereto. At least one of the plurality of first UL channels may be another UL channel (for example, a PUSCH), the second UL channel may be another UL channel (for example, a PUSCH), and the plurality of first UL channels and the second UL channel may be other UL channels (for example, PUSCH). In addition, UCI is interchangeable with UL data/UL-SCH.

In the following description, a case of overlap between a plurality of first UL channels HP #1, HP #2 having a first priority that are not overlapping in the time domain, and a second UL channel HP #3 having a second priority is assumed (see FIG. 5A). FIG. 5A may illustrate the state after collision handling (for example, step 1 in FIG. 2) when UL channels having the same priority are overlapping. In addition, the UCI #1 may correspond (or be assigned) to the first UL channel HP #1, the UCI #2 may correspond to the first UL channel HP #2, and the UCI #3 may correspond to the second UL channel LP #3.

When a predetermined condition is satisfied, the UE may multiplex/map a second UCI corresponding to the second UL channel to a first UCI (or the first UL channel) by using at least one of Options 1-1 to 1-3 hereinbelow.

In the present embodiment, the predetermined condition may be a timeline required for at least one of a first UCI/first UL channel and a second UCI/second UL channel. The predetermined condition may be a maximum coding rate of a UL channel resource to be multiplexed (for example, the first UL channel resource on which the second UCI is multiplexed). If the predetermined condition is not satisfied (for example, in a case where the predetermined timeline is not satisfied/in a case where the maximum coding rate exceeds a given value), the UE may perform control to drop the second UCI (or the second UL channel).

<Option 1-1>

The UE may perform control to map the second UCI corresponding to the second UL channel to a specific UL channel (for example, one UL channel) among the plurality of first UL channels. The specific UL channel may be determined based on the transmission timing of the first UL channel. For example, the specific UL channel may be the first UL channel/UCI (for example, 1st PUCCH/1st UCI) that is transmitted first in the time domain among the plurality of first UL channels/UCI (see FIG. 7).

The UE multiplexes/maps the first UCI #1 corresponding to the first UL channel #1 and the second UCI #3 corresponding to the second UL channel #3 to the first UL channel HP #1. The second UL channel #3 may be controlled to not transmit (for example, to drop). The resources of the first UL channel HP #1 to which the second UCI #3 is multiplexed/mapped may not be changed regardless of the multiplexing of the second UCI #3, or may be changed by the multiplexing of the second UCI #3.

By transmitting the second UCI #3 by utilizing the first UL channel HP #1 transmitted first in the time domain, the delay of the second UCI #3 can be suppressed. In addition, because the second UCI #3 is not mapped to the second or subsequent first UL channels HP #2/UCI #2 in the time domain, it is possible to suppress the effect on the transmission of the second or subsequent first UL channel/UCI.

The second UCI #3 mapped to the first UL channel #1 may be partially dropped, or bundling processing may be applied. For example, the UE may control the mapping method of the second UCI #3 to the first UL channel #1 based on the size/capacity of the first UL channel #1.

Figure 7:
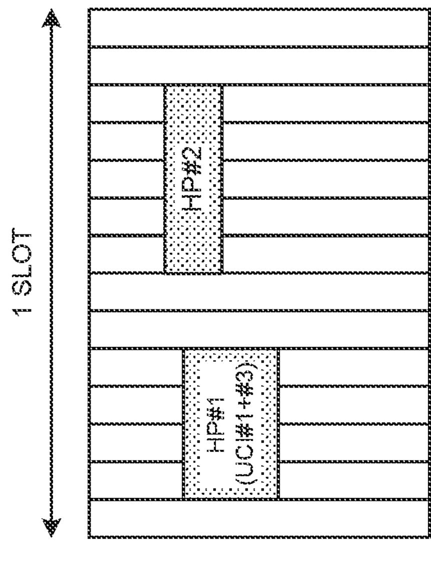
FIG. 7 is a diagram illustrating an example of UL transmission control according to a first aspect.
Figure 7:
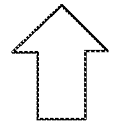
Figure 7:
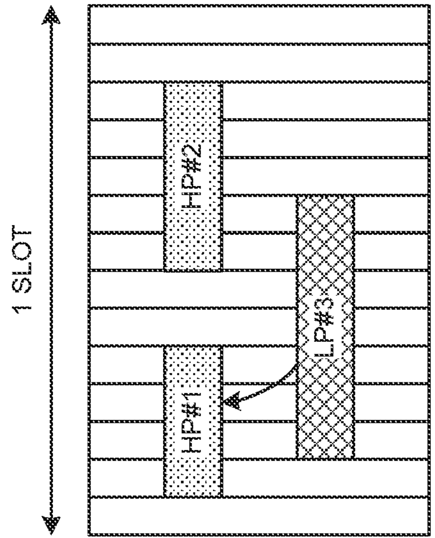

Note that, although FIG. 7 illustrates a case where the second UCI #3 is mapped to the first UL channel HP #1/UCI #1 transmitted first in the time domain, the second UCI #3 may be mapped to the first UL channel HP #2/UCI #2 transmitted last in the time domain.

<Option 1-2>

The specific UL channel that maps the second UCI corresponding to the second UL channel may be determined based on the size/capacity of the first UL channel or the number of bits/bit size/payload capacity that can be transmitted. For example, the specific UL channel may be the first UL channel/UCI capable of transmitting more bits (see FIG. 8).

Figure 8:
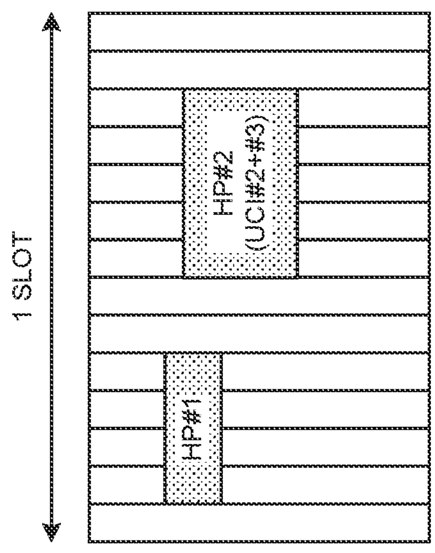
FIG. 8 is a diagram illustrating another example of UL transmission control according to the first aspect.
Figure 8:
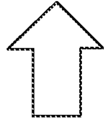
Figure 8:
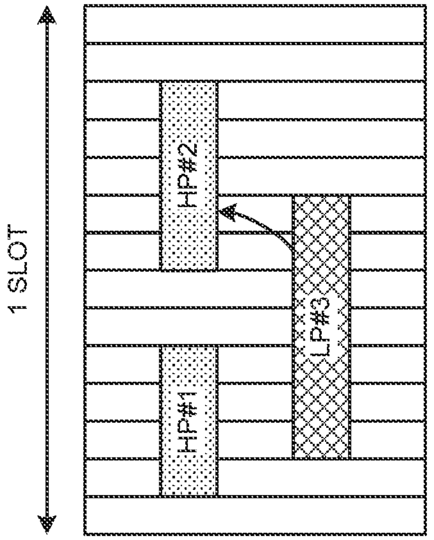

The UE selects a first UL channel/UCI capable of transmitting more bits from among the plurality of first UL channels and multiplexes/maps the second UCI to the selected first UL channel/UCI. FIG. 8 illustrates a case where the second UCI #3 corresponding to the second UL channel #3 is mapped to the first UL channel HP #2 having a large size/capacity. The second UL channel LP #3 may be controlled to not transmit (for example, to drop). The resources of the first UL channel HP #2 to which the second UCI #3 is multiplexed/mapped need not be changed regardless of the multiplexing of the second UCI #3, or may be changed by the multiplexing of the second UCI #3.

By using the first UL channel having a large size/capacity to transmit the second UCI, transmission can be appropriately performed even when the first UCI and the second UCI are transmitted on the same UL channel. In addition, because the second UCI is not mapped to the first UL channel/UCI having a small size/capacity, it is possible to suppress the effect on the transmission of the first UL channel/UCI having a small size/capacity.

The second UCI #3 mapped to the first UL channel HP #1 may be partially dropped, or bundling processing may be applied. For example, the UE may control the mapping method of the second UCI #3 to the first UL channel HP #1 based on the size/capacity of the first UL channel HP #1.

<Option 1-3>

The UE may perform control to map the second UCI corresponding to the second UL channel to the plurality of first UL channels/UCIs. The second UCI may be split and multiplexed/mapped to the plurality of first UL channels/UCI (see FIG. 9).

Figure 9:
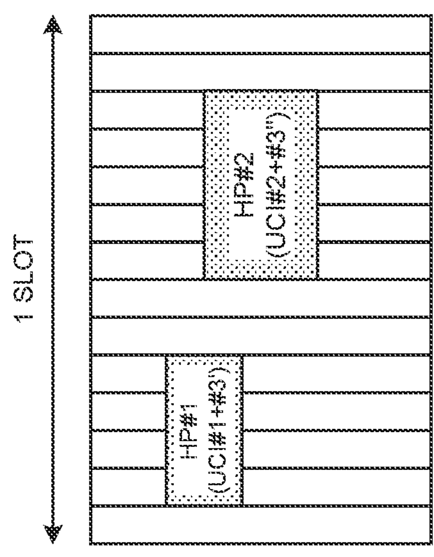
FIG. 9 is a diagram illustrating another example of UL transmission control according to the first aspect.
Figure 9:
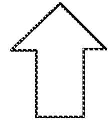
Figure 9:
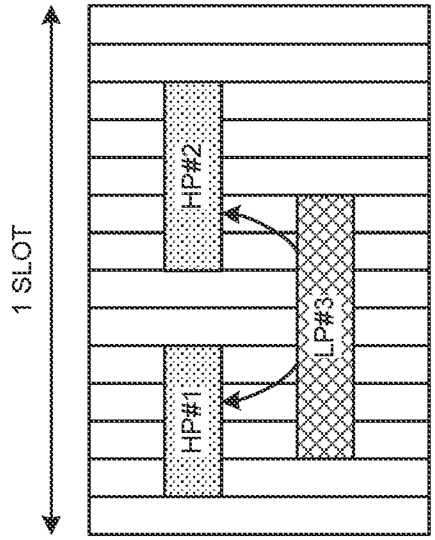

FIG. 9 illustrates a case where the UE splits the second UCI #3, multiplexes/maps the split first part to the first UL channel HP #1 (alternatively, the first UCI #1), and then multiplexes/maps a second part to the second UL channel HP #2 (alternatively, the first UCI #2).

The splitting method for splitting the second UCI may be pre-defined by a specification (for example, split into specific proportions such as half-half), may be notified from the base station to the UE, or may be determined on the basis of a predetermined parameter (for example, the UCI type).

A part of the second UCI #3 mapped to the plurality of first UL channels HP #1 and HP #2 may be dropped, or bundling processing may be applied. For example, the UE may control the mapping method of the second UCI #3 to the first UL channels HP #1, HP #2 based on the size/capacity of the first UL channels HP #1, HP #2. Drop processing of part of the second UCI #3/bundling processing of the second UCI may be performed either before or after splitting the second UCI #3.

By splitting the second UCI into a plurality of parts and multiplexing the plurality of first UL channels/UCI in a distributed manner, the effect on the first UL channel/UCI can be suppressed.

Note that FIG. 9 illustrates a case where the second UCI is split and the split second UCI is mapped to a plurality of first UL channels/first UCI, but the present invention is not limited to such a case. For example, the second UCI may be mapped to a plurality of first UL channels/first UCI without being split.

(Second Aspect)

In a second aspect, an example of UL transmission control in a case (for example, Case 2) where a UL channel having a first priority (for example, high) is overlapping, in the time domain, a plurality of UL channels having a second priority (for example, low) will be described. A case of a plurality of UL channels having a second priority that are not overlapping in the time domain is assumed.

In the following description, a case of overlap between a plurality of second UL channels LP #3, LP #4 having a second priority that are not overlapping in the time domain and a first UL channel HP #2 having a first priority is assumed (see FIG. 5B). FIG. 5B may illustrate the state after collision handling (for example, step 1 in FIG. 2) when UL channels having the same priority are overlapping.

When a predetermined condition is satisfied, the UE may multiplex/map at least one of the plurality of second UCIs #3 and #4 corresponding to the second UL channels LP #3 and LP #4 to the first UCI #2 (alternatively, the first UL channel HP #2) by using at least one of the following Options 2-1 to 2-2.

<Option 2-1>

Figure 10:
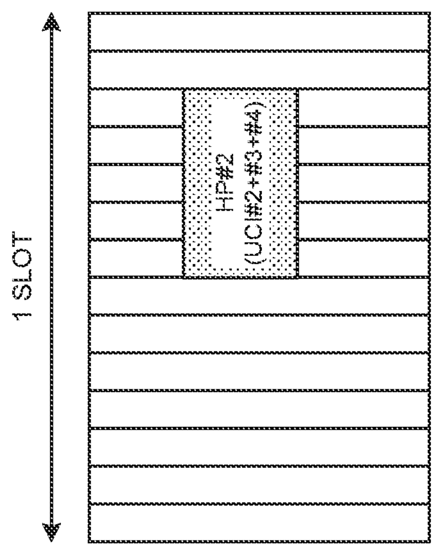
FIG. 10 is a diagram illustrating an example of UL transmission control according to a second aspect.
Figure 10:
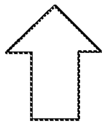
Figure 10:
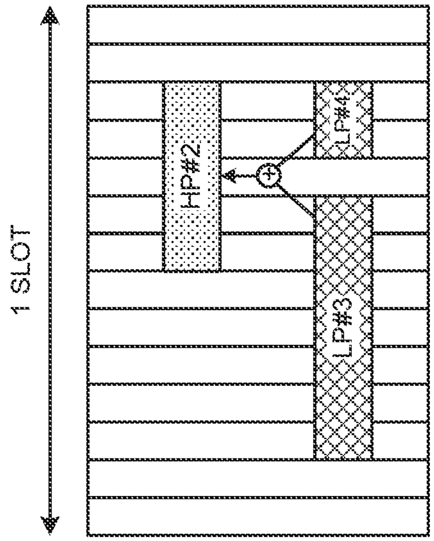

The UE may perform control to combine and multiplex/map the second UCI respectively corresponding to the plurality of second UL channels to the first UL channel #1 (or the first UCI). For example, the UE may first combine the second UCI #3 corresponding to the second UL channel LP #3 and the second UCI #4 corresponding to the second UL channel LP #4, and then multiplex/map the combined second UCI to the first UL channel HP #2 (alternatively, the first UCI #2) (see FIG. 10).

The UE may first apply a combination (alternatively, multiplexing/mapping) of a plurality of second UCI (non-overlapping low priority UCI) in a case where both (or at least one of) the second UL channels LP #3 and LP #4 are overlapping the first UL channel HP #2 (alternatively, the first UCI #2). The UE may then multiplex/map the combined second UCI and the first UCI.

The second UCI #3, #4 mapped to the first UL channel HP #2 may be partially dropped, or bundling processing may be applied. For example, the UE may control the mapping method of the second UCI based on the size/capacity of the first UL channel HP #2. Drop processing of part of the second UCI/bundling processing of the second UCI may be performed either before or after combining the second UCI.

<Option 2-2>

The UE may perform control to multiplex/map a specific second UCI (for example, one second UCI) among the second UCI #3 and #4 corresponding to the plurality of second UL channels LP #3 and LP #4 to the first UL channel HP #2 (alternatively, the first UCI #2). In this case, the UE may perform control so as to not transmit (for example, drop) other second UCI other than the specific second UCI.

The specific second UCI to be transmitted (or the second UCI to be dropped) using the first UL channel may be determined based on a predetermined condition/predetermined rule. The predetermined condition/predetermined rule may be defined by a specification or may be configured/reported from the base station to the UE using higher layer signaling or the like.

The predetermined condition/predetermined rule may be determined based on, for example, the type/content/type of the UCI. In this case, different priorities may also be configured among the UCI corresponding to the second priority.

Figure 11:
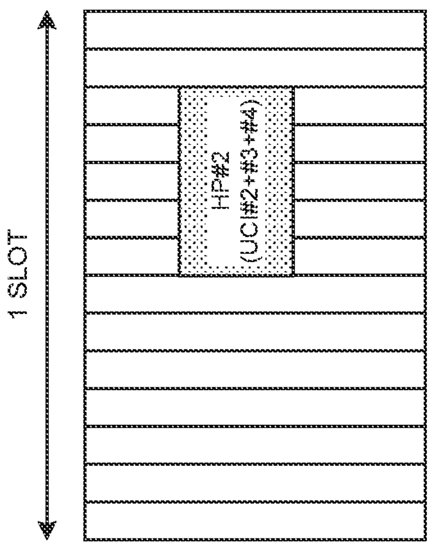
FIG. 11 is a diagram illustrating another example of UL transmission control according to the second aspect.
Figure 11:
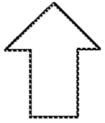
Figure 11:
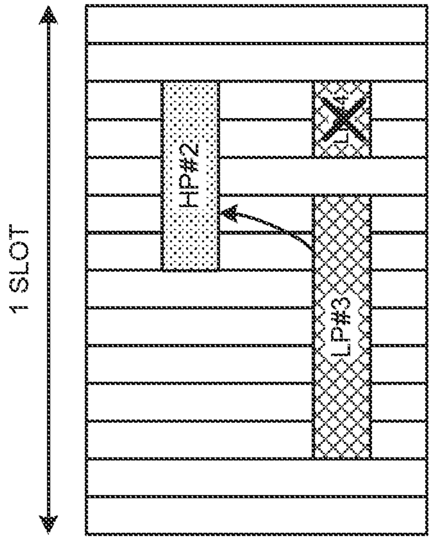

For example, the UCI #A (for example, HARQ-ACK/SR) corresponding to the second priority may be configured to have a higher priority than the UCI #B (for example, CSI) corresponding to the second priority. In a case where the UCI #A corresponds to the second UL channel LP #3 and the UCI #B corresponds to the second UL channel LP #4, control may be performed to multiplex/map the UCI #A (UCI #3) to the first UL channel HP #2 and to not transmit (for example, to drop) the UCI #B (UCI #4) (see FIG. 11).

As a result, an increase in the number of bits of the second UCI multiplexed/mapped on the first UL channel can be suppressed, and hence the transmission of the first UL channel can be appropriately performed. In addition, by performing control to transmit a specific UCI having a high priority among the plurality of UCI having the second priority, it is possible to suppress deterioration in the communication quality.

(Third Aspect)

In a third aspect, an example of UL transmission control in a case (for example, a Case 3) where a plurality of UL channels having a first priority (for example, high) are overlapping a UL channel having a second priority (for example, low), and at least one of a plurality of UL channels having the first priority is overlapping another UL channel having the second priority will be described. A case of a plurality of UL channels having a first priority that are not overlapping in the time domain and a plurality of UL channels having a second priority that are not overlapping in the time domain is assumed.

In the following description, a case of overlap between a plurality of UL channels HP #1 and HP #2 corresponding to a first priority (for example, high) and a UL channel LP #3 corresponding to a second priority (for example, low) is assumed (see FIG. 5C). Further, a case of overlap between a UL channel HP #2 corresponding to a first priority (for example, high) and another UL channel LP #4 corresponding to a second priority (for example, low) is assumed. A case of a plurality of UL channels HP #1 and HP #2 having a first priority that are not overlapping in the time domain is assumed. Further, a case of a plurality of UL channels LP #3 and LP #4 having a second priority that are not overlapping in the time domain is assumed. FIG. 5C may illustrate the state after collision handling (for example, step 1 in FIG. 2) when UL channels having the same priority are overlapping.

When a predetermined condition is satisfied, the UE may multiplex/map at least one of the plurality of second UCIs #3 and #4 corresponding to the second UL channels LP #3 and LP #4 to at least one of the first UCI #1, UCI #2 (alternatively, the first UL channel HP #1, HP #2) by using at least one of the following Options 3-1 to 3-7.

<Option 3-1>

The UE may perform control to combine the second UCI corresponding to a plurality of second UL channels and to map same to a specific UL channel (for example, one UL channel) among the plurality of first UL channels. The specific UL channel may be determined based on the transmission timing of the first UL channel. For example, the specific UL channel may be the first UL channel/UCI (for example, 1st PUCCH/1st UCI) that is transmitted first in the time domain among the plurality of first UL channels/UCI.

Figures 12A, 12B, 12C:
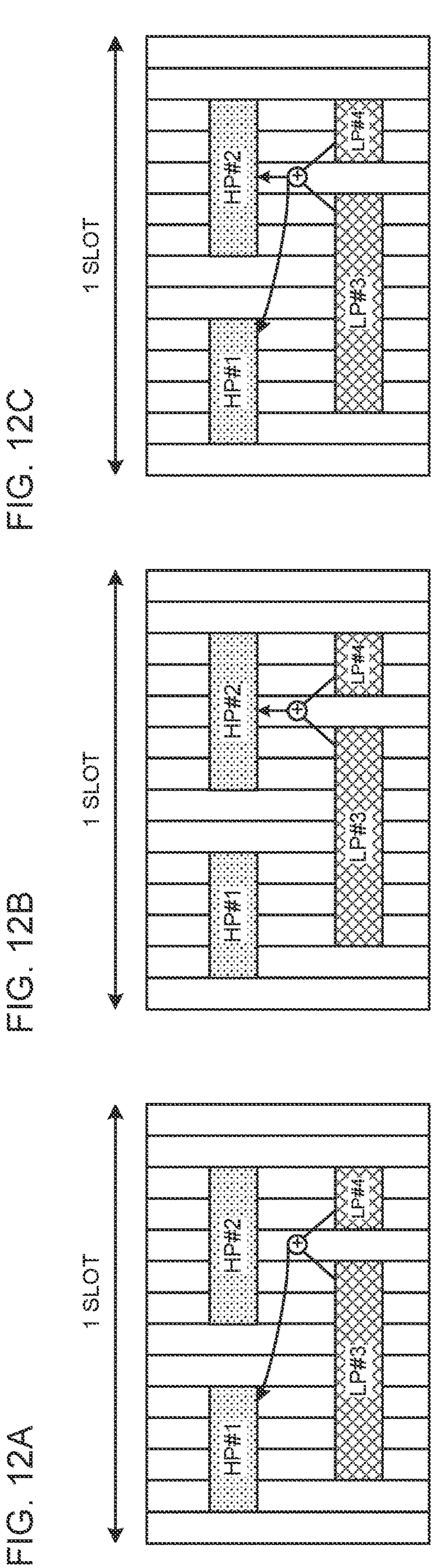
FIGS. 12A to 12C are diagrams illustrating an example of UL transmission control according to a third aspect.

The UE may first combine the second UCI #3 corresponding to the second UL channel LP #3 and the second UCI #4 corresponding to the second UL channel LP #4, and then multiplex/map the combined second UCI to the first UL channel HP #1 (alternatively, the first UCI #1) (see FIG. 12A).

The combining of the plurality of second UCI may be controlled in a manner similar to Option 2-1 of the second aspect. Further, Option 1-1 of the first aspect and Option 2-1 of the second aspect may be applied in combination.

<Option 3-2>

The specific UL channel on which the second UCI corresponding to the plurality of second UL channels are combined and then mapped may be determined based on the size/capacity of the first UL channel or the number of bits/bit size that can be transmitted. For example, the specific UL channel may be the first UL channel/UCI capable of transmitting more bits (see FIG. 12B).

The UE selects a first UL channel/UCI capable of transmitting more bits from among the plurality of first UL channels and multiplexes/maps a plurality of second UCI that have been combined with the selected first UL channel/UCI. FIG. 12B illustrates a case where the second UCI #3, #4 corresponding to the second UL channel LP #3, LP #4 are mapped to the first UL channel HP #2 having a large size/capacity. The second UL channel LP #3, #4 may be controlled to not transmit (for example, to drop).

By using the first UL channel having a large size/capacity to transmit the second UCI, transmission can be appropriately performed even when the plurality of second UCI thus combined are transmitted using the first UL channel. In addition, because the second UCI is not mapped to the first UL channel/the first UCI having a small size/capacity, it is possible to suppress the effect on the transmission of the first UL channel/the first UCI having a small size/capacity.

The combining of the plurality of second UCI may be controlled in a manner similar to Option 2-1 of the second aspect. Further, Option 1-2 of the first aspect and Option 2-1 of the second aspect may be applied in combination.

<Option 3-3>

After combining the second UCI respectively corresponding to the plurality of second UL channels, control may be performed so that the combined second UCI are split and multiplexed/mapped to a plurality of first UL channels/UCI (see FIG. 12C).

FIG. 12C illustrates a case where the UE combines a plurality of second UCI #3, #4 and then splits the combined second UCI before multiplexing/mapping the split first part to the first UL channel HP #1 (alternatively, the first UCI #1), and then multiplexes/maps the second part to the second UL channel HP #2 (alternatively, the first UCI #2).

The combining of the plurality of second UCI may be controlled in a manner similar to Option 2-1 of the second aspect. The splitting method for splitting the combined second UCI may be controlled similarly to Option 1-3 of the first aspect. Further, Option 1-3 of the first aspect and Option 2-1 of the second aspect may be applied in combination.

<Option 3-4>

The UE may perform control to map a specific second UCI (for example, one second UCI), among the second UCI respectively corresponding to the plurality of second UL channels, to a specific UL channel (for example, one UL channel) among the plurality of first UL channels. In this case, the UE may perform control so as to not transmit (for example, drop) other second UCI other than the specific second UCI.

The specific second UCI (or the second UCI to be dropped) may be determined based on a predetermined condition/predetermined rule. The predetermined condition/predetermined rule may be defined by a specification or may be configured/reported from the base station to the UE using higher layer signaling or the like. The predetermined condition/predetermined rule may be determined based on, for example, the type/content/type of the UCI. In this case, different priorities may also be configured among the UCI corresponding to the second priority.

The specific UL channel may be determined based on the transmission timing of the first UL channel. For example, the specific UL channel may be the first UL channel/UCI (for example, 1st PUCCH/1st UCI) that is transmitted first in the time domain among the plurality of first UL channels/UCI.

Figures 13A, 13B, 13C:
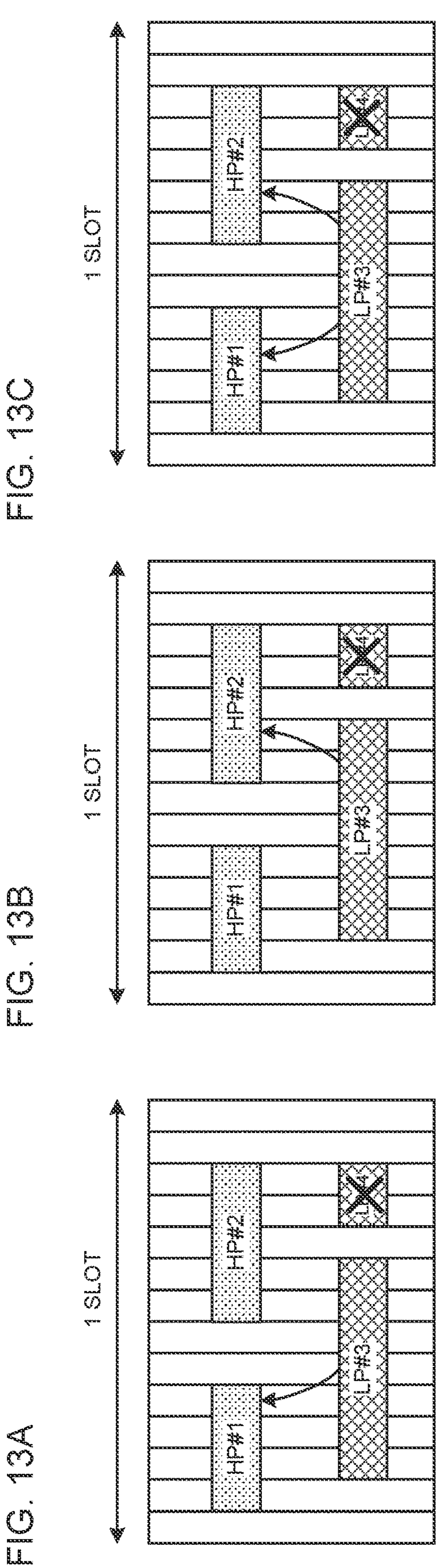
FIGS. 13A to 13C are diagrams illustrating another example of UL transmission control according to the third aspect.

The UE may first select one of the second UCI #3 corresponding to the second UL channel LP #3 and the second UCI #4 corresponding to the second UL channel LP #4, and then multiplex/map the selected second UCI to the first UL channel HP #1 (alternatively, the first UCI #1) (see FIG. 13A).

For example, the UE may apply Option 1-1 of the first aspect and Option 2-2 of the second aspect in combination.

<Option 3-5>

The specific UL channel that maps the specific second UCI may be determined based on the size/capacity of the first UL channel or the number of bits/bit size that can be transmitted. For example, the specific UL channel may be the first UL channel/the first UCI capable of transmitting more bits (see FIG. 13B).

The UE selects a first UL channel/UCI capable of transmitting more bits from among the plurality of first UL channels and multiplexes/maps a specific second UCI to the selected first UL channel/UCI. FIG. 13B illustrates a case where the second UCI #3 corresponding to the second UL channel LP #3 is mapped to the first UL channel HP #2 having a large size/capacity.

For example, the UE may apply Option 1-2 of the first aspect and Option 2-2 of the second aspect in combination.

By using the first UL channel having a large size/capacity to transmit the second UCI, transmission can be appropriately performed even when the plurality of second UCI thus combined are transmitted using the first UL channel. In addition, because the second UCI is not mapped to the first UL channel/the first UCI having a small size/capacity, it is possible to suppress the effect on the transmission of the first UL channel/the first UCI having a small size/capacity.

<Option 3-6>

The specific second UCI may be controlled to be split and multiplexed/mapped to the plurality of first UL channels/first UCI (see FIG. 13C).

FIG. 13C illustrates a case where the UE selects one second UCI from a plurality of second UCI #3, #4 and splits the selected second UCI before multiplexing/mapping the split first part to the first UL channel HP #1 (alternatively, the first UCI #1), and then multiplexes/maps the second part to the second UL channel HP #2 (alternatively, the first UCI #2).

The splitting method for splitting the second UCI may be controlled similarly to Option 1-3 of the first aspect. Further, Option 1-3 of the first aspect and Option 2-2 of the second aspect may be applied in combination.

<Option 3-7>

The second UCI corresponding to each of the plurality of second UL channels may be controlled to be multiplexed/mapped to each of the separate first UL channels.

For example, the UE may perform control to multiplex/map the second UCI #3 corresponding to the second UL channel #3 to the first UL channel #1 (alternatively, the first UCI #1) and multiplex/map the second UCI #4 corresponding to the second UL channel #4 to the first UL channel #2 (alternatively, the first UCI #2).

As a result, because the plurality of second UCI to be multiplexed/mapped on the first UL channel can be distributed, the transmission of the first UL channel can be appropriately performed.

(Fourth Aspect)

In a fourth aspect, an example of UL transmission control in a case where a UL channel having a second priority (for example, low) that is not overlapping, in the time domain, a UL channel having a first priority (for example, high) is overlapping another UL channel having a second priority will be described. Note that, a case of a UL channel having a first priority and another UL channel having a second priority that are not overlapping in the time domain is assumed.

For example, in Case 4 (see FIG. 5D), the UE performs collision handling prior to collision handling (for example, step 1 in FIG. 2) when channels having the same priority collide with each other, or in a case where first UL channels having the first priority collide. Thereafter, the UE may control, based on a predetermined rule, transmission of the UCI #3 corresponding to the second UL channel LP #3 that is overlapping the first UL channel and transmission of the UCI #4 corresponding to the second UL channel LP #4 that is not overlapping the first UL channel.

The UE may control the UL transmission by using steps A1 to A3 hereinbelow. Note that a case where the second UL channels LP #3 and LP #4 overlap in the time domain is assumed.

Figure 14:
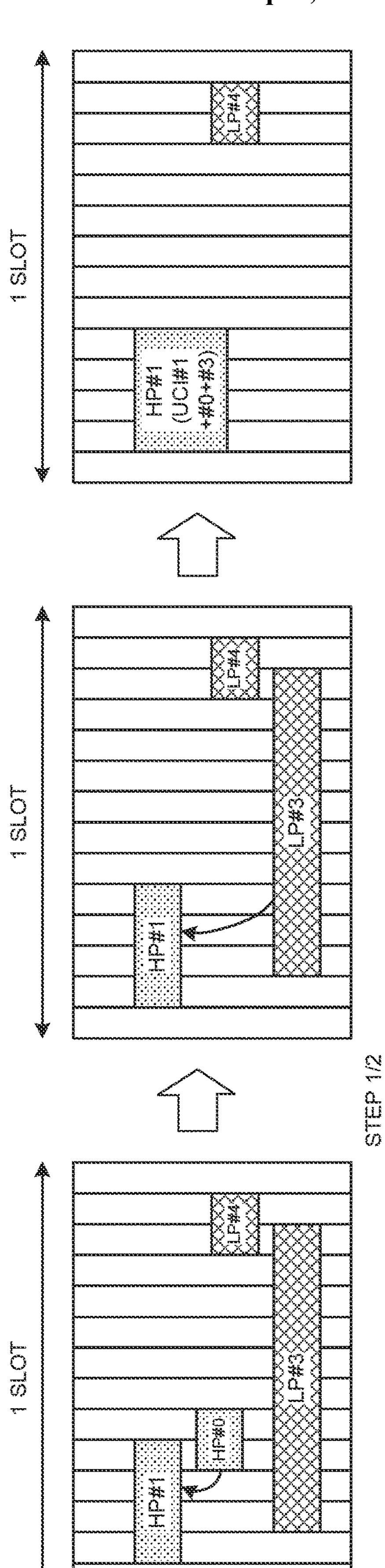
FIG. 14 is a diagram illustrating an example of UL transmission control according to a fourth aspect.

FIG. 14 illustrates a case where the first UL channels HP #0 and HP #1 having a first priority are overlapping, the second UL channel LP #3 having the second priority is overlapping the first UL channels HP #0 and HP #1, and the second UL channel LP #4 having a second priority is overlapping the second UL channel LP #3 without overlapping the first UL channels HP #0 and HP #1.

<Step 1>

When UL channels/UCI having a first priority are overlapping, collision handling is performed between the UL channels/UCI having the first priority. In FIG. 14, the UE performs control to multiplex/map one of the first UL channel HP #0/UCI #0 and the first UL channel HP #1/UCI #1 to the other. Here, a case where the UCI #0 is to be multiplexed/mapped to the first UL channel HP #1/UCI #1 is illustrated.

<Step 2>

A plurality of second UL channels having a second priority may be grouped. For example, the plurality of second UL channels may be classified into a first part and a second part. The first part may be referred to as the first group, the first PUCCH part, and the first part, and the second part may be referred to as the second group, the second PUCCH part, and the second part.

The grouping may be performed based on a predetermined rule. The predetermined rule may be based on, for example, whether or not there is overlap with the first UL channels in the time domain. As an example, one or more second UL channels/UCI overlapping a first UL channel (UL channel HP #1 in FIG. 14) after Step 1 may be classified as the first part. In addition, one or more second UL channels/UCI that are not overlapping a first UL channel (the UL channel HP #1 in FIG. 14) after Step 1 may be classified as the second part.

When the plurality of second UL channels classified as the first part are overlapping in the time domain, collision handling between the plurality of second UL channels/UCI may be performed. For example, a specific UL channel may be selected from among a plurality of second UL channels. In this case, control may be performed to multiplex/map the UCI having the second priority included in the first part to the specific UL channel.

When the plurality of second UL channels classified as the second part are overlapping in the time domain, collision handling between the plurality of second UL channels/UCI may be performed. For example, a specific UL channel may be selected from among a plurality of second UL channels. In this case, control may be performed to multiplex/map the UCI having the second priority included in the second part to the specific UL channel.

FIG. 14 illustrates a case where the second UL channel #3 is included in the first part/first group and the second UL channel #4 is included in the second part/second group.

<Step 3>

Control may be performed such that, after step 2, among the second UL channels/UCI (for example, a first group) overlapping the first UL channel/UCI and the second UL channel/UCI (for example, a second group) not overlapping the first UL channel/UCI, the UCI of at least the first group is multiplexed/mapped to the first UL channel/UCI.

For example, a case is assumed where, after step 2, a second UL channel/UCI (the second UL channel LP #3 in FIG. 14) overlapping the first UL channel/UCI (the first UL channel HP #1 in FIG. 14) and another second UL channel/UCI (the second UL channel LP #4 in FIG. 14) overlapping the second UL channel/UCI exist.

In a case where the number of first UL channels (for example, a first UL channel that is overlapping a second UL channel LP #3) after step 1 is one, the UE may perform control to multiplex/map the first group of second UL channels/UCI to the first UL channel. In this case, the second UL channel LP #3 may be dropped.

Figure 15:
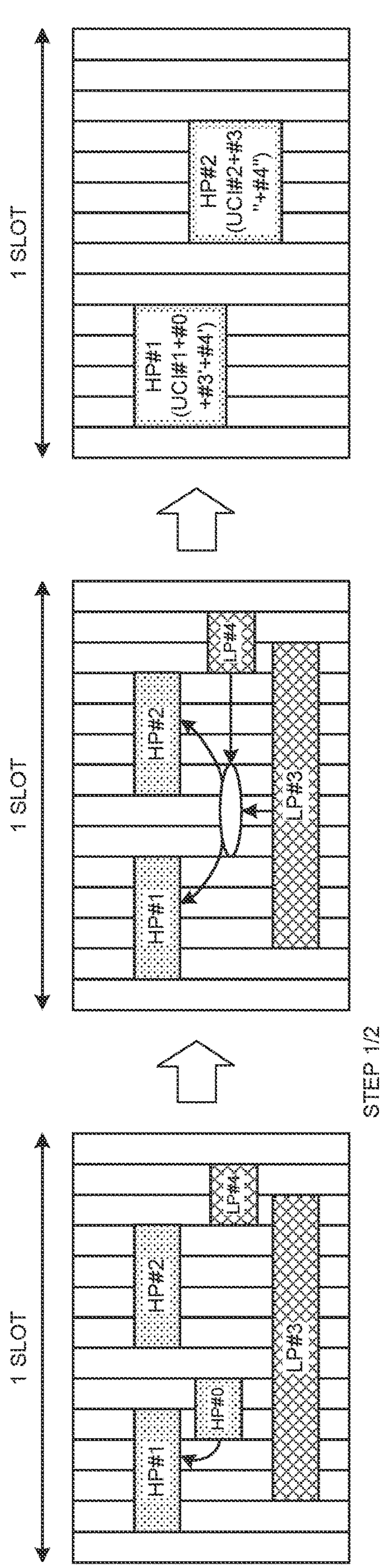
FIG. 15 is a diagram illustrating another example of UL transmission control according to the fourth aspect.

In a case where the number of first UL channels (for example, a first UL channel that is overlapping a second UL channel #3) after step 1 is greater than one, or is two or more, the UE may perform control to multiplex/map the first group of second UL channels LP #3/UCI to a plurality of first UL channels. In addition, the UE may directly transmit a second group of second UL channels LP #4/UCI that are not overlapping the first UL channel, or may perform control to multiplex/map these channels to the plurality of first UL channels (see FIG. 15). In this case, at least one of Options 3-1 to 3-7 in the third aspect may be used.

<UE Capability Information>

In a case where a UL channel having a first priority and a UL channel having a second priority are overlapping in time domain, the UE may report UE capability information regarding whether to support multiplexing/mapping, to a first UL channel, of UCI corresponding to a UL channel having a second priority.

In a case where one or more (for example, two) UL channels/UCI having a second priority collide with one or more UL channel/UCI having a first priority, the UE may also report UE capability information regarding whether or not to support multiplexing/mapping of second-priority UCI to a UL channel/UCI having a first priority.

The UE may report UE capability information regarding whether or not to support bundling/dropping for UCI (for example, second-priority UCI) in performing multiplexing/mapping of UL channels/UCI having different priorities.

Before performing collision handling (alternatively, collision resolution) between channels having the same priority, in a case where a UL channel having a second priority is not overlapping a UL channel having a first priority (for example, Case 4), UE capability information regarding whether to support new multiplexing/prioritization according to the first to fourth aspects may be reported. In a case where the UE does not support the UE capability, even when UL channels having a second priority collide with a first UL channel as a result of multiplexing due to collision handling of the UL channels having the second priority, the UL channels/UCI having the second priority may be dropped similarly to the existing system.

The UE may report UE capability information regarding whether or not to support collision handling (alternatively, collision resolution) rules/actions (for example, step 2/step 3 according to the fourth aspect) for a plurality of parts of UL channels/UCI having the same priority (for example, two parts). For example, the UE may report whether support is to be provided for multiplexing/mapping the second UL channel LP #3 overlapping the UL channel having the first priority and the non-overlapping second UL channel LP #4 in FIGS. 14 and 15, to the first UL channel, respectively. In a case where the UE does not support the UE capability information, the second UL channels #3, #4 may be aggregated into one second UL channel and then multiplexed/mapped to the first UL channel.

Note that the base station may use higher layer signaling to report to the UE/configure the above-described UE capability information (for example, the presence or absence of support for a predetermined operation). The base station may control whether or not to configure the predetermined operation on the basis of the UE capability information reported from the UE, or may control whether or not to configure the predetermined operation without considering the UE capability information.

(Radio Communication System)

Hereinafter, a configuration of a radio communication system according to one embodiment of the present disclosure will be described. In this radio communication system, communication is performed using any one of the radio communication methods according to the embodiments of the present disclosure, or a combination thereof.

Figure 16:
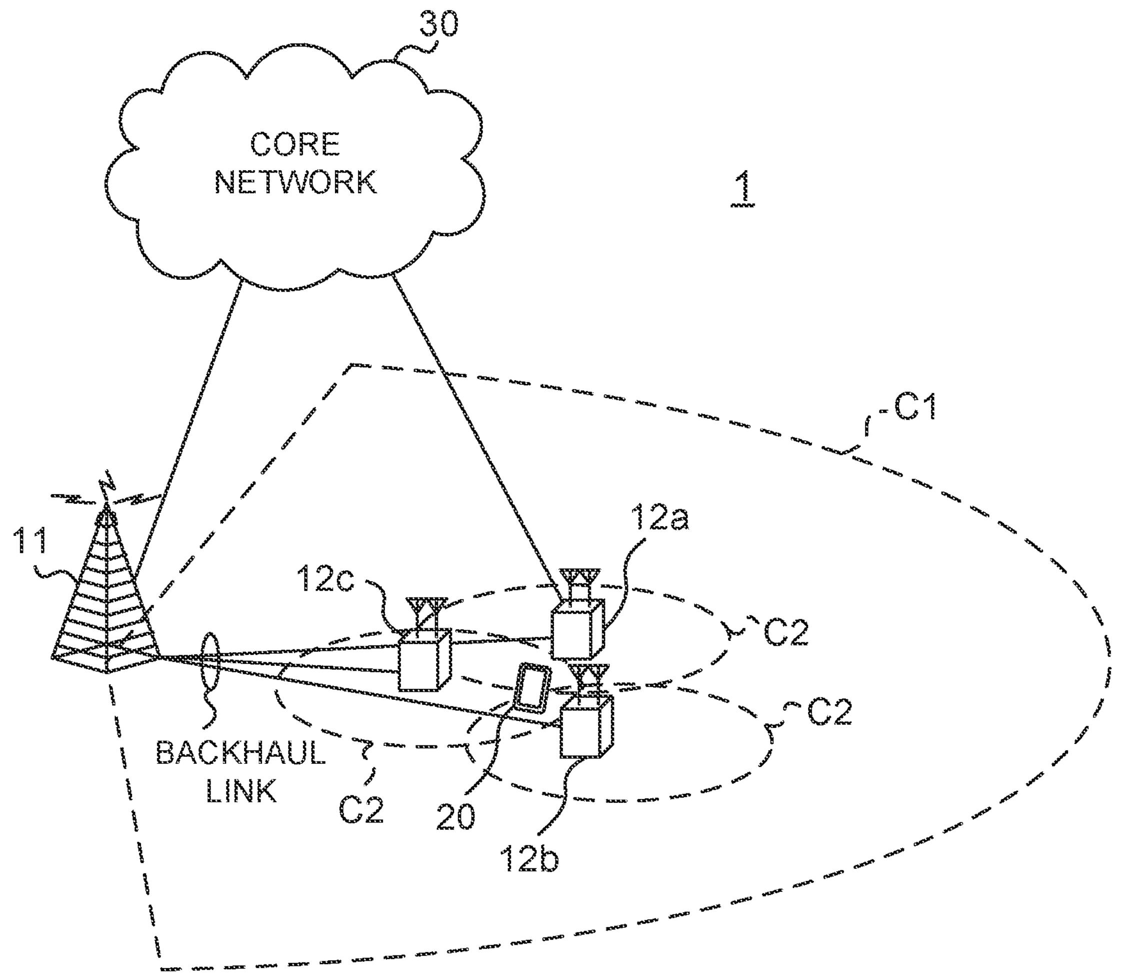
FIG. 16 is a diagram illustrating an example of a schematic configuration of a radio communication system according to one embodiment.

FIG. 16 is a diagram illustrating an example of a schematic configuration of a radio communication system according to one embodiment. A radio communication system 1 may be a system that implements communication using Long-Term Evolution (LTE), 5th generation mobile communication system New Radio (5G NR), and/or the like, drafted as specifications by the Third Generation Partnership Project (3GPP).

Further, the radio communication system 1 may support RAT dual connectivity (Multi-RAT Dual Connectivity (MR-DC)) between a plurality of Radio Access Technologies (RATs). The MR-DC may include dual connectivity between LTE (Evolved Universal Terrestrial Radio Access (E-UTRA)) and NR (E-UTRA-NR Dual Connectivity (EN-DC)), Dual Connectivity between NR and LTE (NR-E-UTRA Dual Connectivity (NE-DC)), and the like.

In EN-DC, an LTE (E-UTRA) base station (eNB) is a Master Node (MN), and an NR base station (gNB) is a Secondary Node (SN). In NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR Dual Connectivity (NN-DC)).

The radio communication system 1 may include a base station 11 that forms a macro cell C1 having a relatively wide coverage, and base stations 12 (12*a* to 12*c*) that are arranged within the macro cell C1 and that form small cells C2 narrower than the macro cell C1. A user terminal 20 may be positioned in at least one cell. The arrangement, number, and the like, of cells and the user terminals 20 are not limited to the aspects illustrated in the drawings. Hereinafter, when not distinguished from each other, the base stations 11 and 12 will be collectively referred to as the base station 10.

The user terminal 20 may be connected to at least one of the plurality of base stations 10. The user terminal 20 may use Carrier Aggregation (CA) using a plurality of Component Carriers (CC) and/or dual connectivity (DC).

Each CC may be included in a first frequency range (Frequency Range 1 (FR1)) and/or a second frequency range (Frequency Range 2 (FR2)). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency bands, definitions, and the like of the FR1 and FR2 are not limited thereto, and, for example, the FR1 may correspond to a frequency band higher than the FR2.

Further, the user terminal 20 may perform communication in each CC by using at least one of Time Division Duplex (TDD) or Frequency Division Duplex (FDD).

The plurality of base stations 10 may be connected by wire (for example, an optical fiber or an X2 interface in compliance with Common Public Radio Interface (CPRI)), or connected wirelessly (for example, NR communication). For example, when NR communication is used as a backhaul between the base stations 11 and 12, the base station 11 corresponding to a higher-level station may be referred to as an Integrated Access and Backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an Evolved Packet Core (EPC), a 5G Core Network (5GCN), or a Next Generation Core (NGC).

The user terminal 20 may be a terminal that corresponds to at least one of communication methods such as LTE, LTE-A, and 5G.

In the radio communication system 1, a radio access method based on Orthogonal Frequency Division Multiplexing (OFDM) may be used. For example, in a Downlink (DL) and/or an Uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access method.

In the radio communication system 1, as a downlink channel, a Physical Downlink Shared Channel (PDSCH), a Physical Broadcast Channel (PBCH), a Physical Downlink Control Channel (PDCCH), or the like, which is shared by the user terminals 20, may be used.

Further, in the radio communication system 1, as an uplink channel, a Physical Uplink Shared Channel (PUSCH), a Physical Uplink Control Channel (PUCCH), a Physical Random Access Channel (PRACH), or the like, which is shared by the user terminals 20, may be used.

User data, higher layer control information, a System Information Block (SIB), and the like, are transmitted by the PDSCH. The PUSCH may transmit the user data, higher layer control information, and the like. Furthermore, a Master Information Block (MIB) may be transmitted by the PBCH.

Lower layer control information may be transmitted by the PDCCH. The lower layer control information may include, for example, Downlink Control Information (DCI) including scheduling information of at least one of the PDSCH or the PUSCH.

Note that the DCI that schedules the PDSCH may be referred to as DL assignment, DL DCI, or the like, and the DCI that schedules the PUSCH may be referred to as UL grant, UL DCI, or the like. Note that PDSCH is interchangeable with DL data, and PUSCH is interchangeable with UL data.

For PDCCH detection, a COntrol REsource SET (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space on the basis of search space configuration.

One search space may correspond to a PDCCH candidate corresponding to one or more aggregation levels. One or more search spaces may be referred to as a search space set. Note that "search space" and "search space set", "search space configuration", "search space set configuration", "CORESET" and "CORESET configuration", and the like, in the present disclosure are interchangeable.

Uplink control information (UCI) including at least one of Channel State Information (CSI), delivery acknowledgement information (which may be referred to as, for example, a Hybrid Automatic Repeat reQuest ACKnowledgement (HARQ-ACK), ACK/NACK, or the like), and a Scheduling Request (SR) may be transmitted by the PUCCH. A random access preamble for establishing connection with a cell may be transmitted by the PRACH.

Note that, in the present disclosure, downlink, uplink, and the like, may be expressed without adding "link". Various channels may be expressed without adding "physical" at the beginning thereof.

In the radio communication system 1, a Synchronization Signal (SS), a Downlink Reference Signal (DL-RS), and the like, may be transmitted. In the radio communication system 1, a Cell-Specific Reference Signal (CRS), a Channel State Information Reference Signal (CSI-RS), a DeModulation Reference Signal (DMRS), a Positioning Reference Signal (PRS), a Phase Tracking Reference Signal (PTRS), or the like, may be transmitted as the DL-RS.

The synchronization signal may be, for example, at least one of a Primary Synchronization Signal (PSS) and a Secondary Synchronization Signal (SSS). A signal block including the SS(PSS or SSS) and the PBCH (and the DMRS for the PBCH) may be referred to as an SS/PBCH block, an SS Block (SSB), or the like. Note that, the SS, the SSB, or the like may also be referred to as a reference signal.

Furthermore, in the radio communication system 1, a measurement reference signal (Sounding Reference Signal (SRS)), a demodulation reference signal (DMRS), or the like may be transmitted as an Uplink Reference Signal (UL-RS). Note that a DMRS may be referred to as a user terminal-specific reference signal (UE-specific Reference Signal).

(Base Station)

Figure 17:
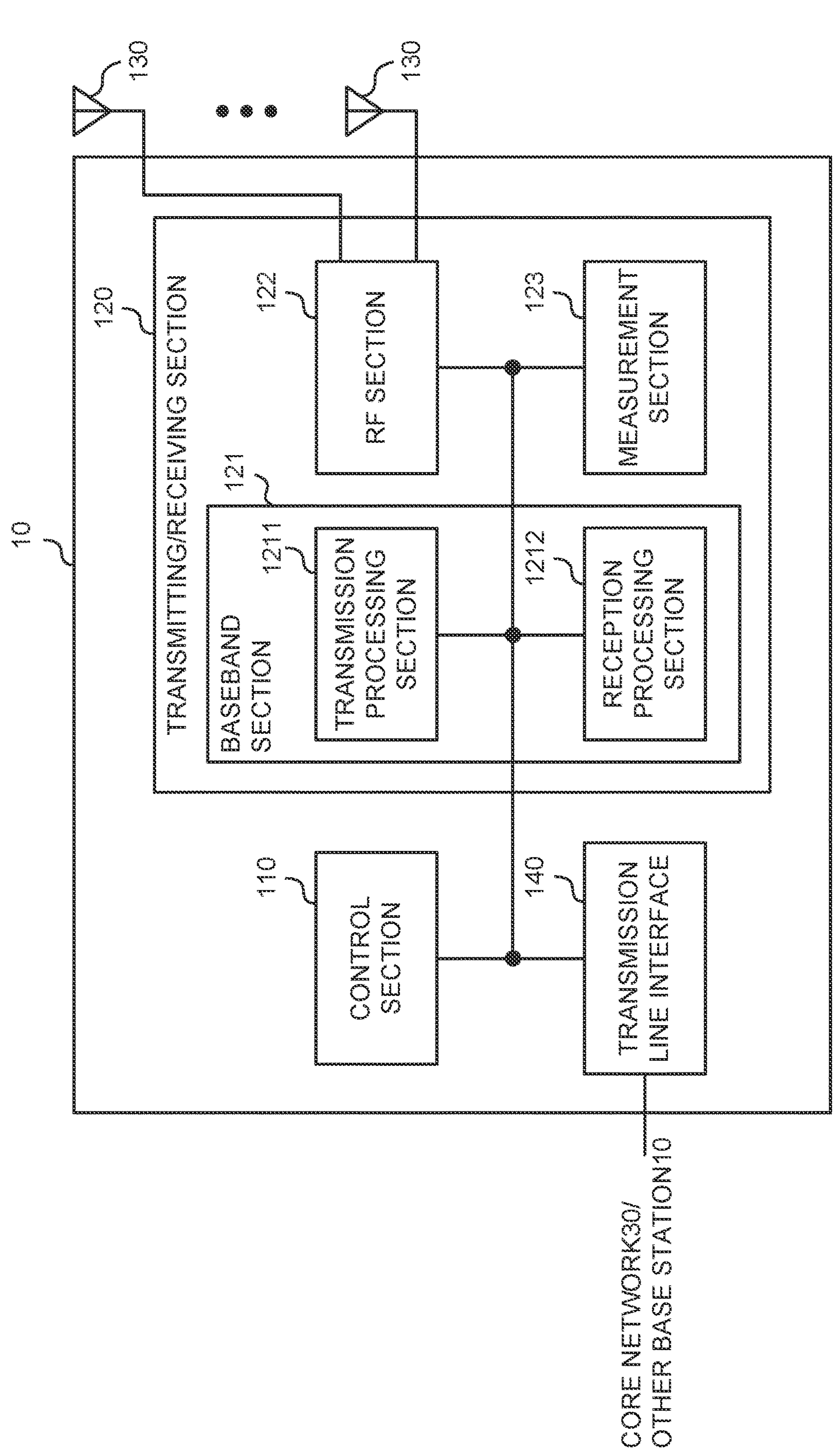
FIG. 17 is a diagram illustrating an example of a configuration of a base station according to one embodiment.

FIG. 17 is a diagram illustrating an example of a configuration of the base station according to one embodiment. The base station 10 includes a control section 110, a transmitting/receiving section 120, a transmitting/receiving antenna 130, and a transmission line interface 140. Note that one or more control sections 110, one or more transmitting/receiving sections 120, one or more transmitting/receiving antennas 130, and one or more transmission line interfaces 140 may be included.

Note that this example mainly describes functional blocks which are characteristic parts of the present embodiment, and it may be assumed that the base station 10 also has other functional blocks necessary for radio communication. Part of the processing of each section described hereinbelow may be omitted.

The control section 110 controls the entire base station 10. The control section 110 can be constituted by a controller, a control circuit, and the like that are described based on common sense in the technical field pertaining to the present disclosure.

The control section 110 may control signal generation, scheduling (for example, resource allocation or mapping), and the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like, and may forward same to the transmitting/receiving section 120. The control section 110 may perform call processing (such as configuration or release) of a communication channel, management of the state of the base station 10, and management of a radio resource, and the like.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmitting/receiving circuit, and the like that are described on the basis of common sense in the technical field pertaining to the present disclosure.

The transmitting/receiving section 120 may be configured as an integrated transmitting/receiving section, or may be constituted by a transmitting section and a receiving section. The transmitting section may include the transmission processing section 1211 and an RF section 122. The receiving section may be constituted by the reception processing section 1212, the RF section 122, and the measurement section 123.

The transmitting/receiving antenna 130 can be constituted by an antenna described based on common sense in the technical field pertaining to the present disclosure, for example, an array antenna and/or the like.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam and a reception beam by using digital beam forming (for example, precoding), analog beam forming (for example, phase rotation), and the like.

The transmitting/receiving section 120 (transmission processing section 1211) may perform Packet Data Convergence Protocol (PDCP) layer processing, Radio Link Control (RLC) layer processing (for example, RLC retransmission control), Medium Access Control (MAC) layer processing (for example, HARQ retransmission control), and the like on data, control information, and the like acquired from the control section 110, for example, to generate a bit string to be transmitted.

The transmitting/receiving section 120 (transmission processing section 1211) may perform transmission processing such as channel encoding (which may include error correction encoding), modulation, mapping, filter processing, Discrete Fourier Transform (DFT) processing (if necessary), Inverse Fast Fourier transform (IFFT) processing, precoding, or digital-analog conversion on the bit string to be transmitted, and output a baseband signal.

The transmitting/receiving section 120 (RF section 122) may perform modulation to a radio frequency band, filter processing, amplification, and the like on the baseband signal, and may transmit a signal in the radio frequency band via the transmitting/receiving antenna 130.

Meanwhile, the transmitting/receiving section 120 (RF section 122) may perform amplification, filter processing, demodulation to a baseband signal, and the like on the signal in the radio frequency band received by the transmitting/receiving antenna 130.

The transmitting/receiving section 120 (reception processing section 1212) may apply reception processing such as analog-digital conversion, Fast Fourier Transform (FFT) processing, Inverse Discrete Fourier Transform (IDFT) processing (if necessary), filter processing, demapping, demodulation, decoding (which may include error correction decoding), MAC layer processing, RLC layer processing, or PDCP layer processing on the acquired baseband signal, and acquire user data and the like.

The transmitting/receiving section 120 (measurement section 123) may carry out measurement on the received signal. For example, the measurement section 123 may perform Radio Resource Management (RRM), Channel State Information (CSI) measurement, and the like based on the received signal. The measurement section 123 may measure received power (for example, Reference Signal Received Power (RSRP)), received quality (for example, Reference Signal Received Quality (RSRQ), a Signal to Interference plus Noise Ratio (SINR), a Signal to Noise Ratio (SNR)), signal strength (for example, Received Signal Strength Indicator (RSSI)), propagation path information (for example, CSI), and the like. The measurement result may be outputted to the control section 110.

The transmission line interface 140 may transmit/receive a signal (backhaul signaling) to and from an apparatus included in the core network 30, another base station 10, and the like, and may acquire, transmit, and so forth, user data (user plane data) for the user terminal 20, and control plane data, and the like.

Note that the transmitting section and the receiving section of the base station 10 in the present disclosure may be constituted by at least one of the transmitting/receiving section 120, the transmitting/receiving antenna 130, or the transmission line interface 140.

When the plurality of first uplink channels that are not overlapping in the time domain and the second uplink channel are overlapping, the transmitting/receiving section 120 may receive the first uplink channel to which the uplink control information corresponding to the second uplink channel is mapped.

In a case where a first uplink channel and a plurality of second uplink channels that are not overlapping in the time domain are overlapping, the transmitting/receiving section 120 may receive a first uplink channel to which at least one of the uplink control information corresponding to each of the plurality of second uplink channels is mapped.

The control section 110 may control allocation of the first uplink channel and the second uplink channel having a lower priority than the first uplink channel.

(User Terminal)

Figure 18:
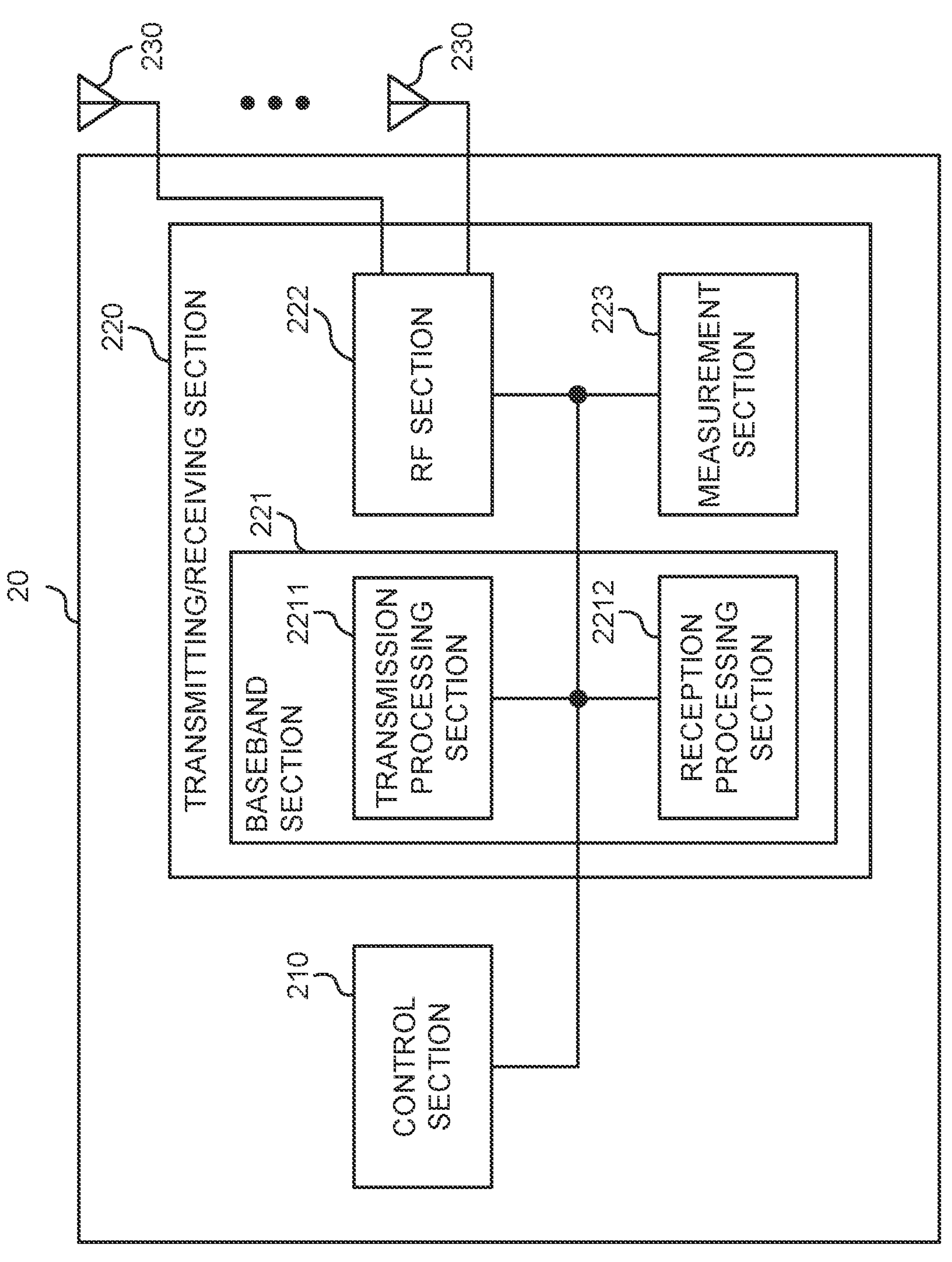
FIG. 18 is a diagram illustrating an example of a configuration of a user terminal according to one embodiment.

FIG. 18 is a diagram illustrating an example of a configuration of a user terminal according to one embodiment. The user terminal 20 includes a control section 210, a transmitting/receiving section 220, and a transmitting/receiving antenna 230. Note that one or more of the control section 210, the transmitting/receiving section 220, and the transmitting/receiving antenna 230 may be included.

Note that, although this example mainly describes functional blocks which are characteristic parts of the present embodiment, it may be assumed that the user terminal 20 also has other functional blocks necessary for radio communication. Part of the processing of each section described hereinbelow may be omitted.

The control section 210 controls the entire user terminal 20. The control section 210 can be constituted by a controller, a control circuit, and the like that are described on the basis of common sense in the technical field pertaining to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data, control information, a sequence, and the like to be transmitted as signals, and may forward same to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmitting/receiving circuit, and the like that are described based on common sense in the technical field pertaining to the present disclosure.

The transmitting/receiving section 220 may be constituted as an integrated transmitting/receiving section, or may be constituted by a transmitting section and a receiving section. The transmitting section may include the transmission processing section 2211 and the RF section 222. The receiving section may be constituted by the reception processing section 2212, the RF section 222, and the measurement section 223.

The transmitting/receiving antenna 230 can be constituted by an antenna described on the basis of common sense in the technical field pertaining to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on data, control information, and the like acquired from the control section 210, for example, and generate a bit string to be transmitted.

The transmitting/receiving section 220 (transmission processing section 2211) may perform transmission processing such as channel encoding (which may include error correction encoding), modulation, mapping, filter processing, DFT processing (if necessary), IFFT processing, precoding, or digital-analog conversion on the bit string to be transmitted, and output a baseband signal.

Note that whether or not to apply DFT processing may be determined based on configuration of transform precoding. In a case where transform precoding is enabled for a certain channel (for example, PUSCH), the transmitting/receiving section 220 (transmission processing section 2211) may perform DFT processing as the transmission processing in order to transmit the channel using a DFT-s-OFDM waveform, and otherwise need not perform DFT processing as the transmission processing.

The transmitting/receiving section 220 (RF section 222) may perform modulation to a radio frequency range, filter processing, amplification, and the like on the baseband signal, and transmit a signal in the radio frequency range via the transmitting/receiving antenna 230.

Meanwhile, the transmitting/receiving section 220 (RF section 222) may perform amplification, filter processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filter processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may carry out measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be outputted to the control section 210.

Note that the transmitting section and the receiving section of the user terminal 20 in the present disclosure may be constituted by at least one of the transmitting/receiving section 220 and the transmitting/receiving antenna 230.

The transmitting/receiving section 220 may transmit the uplink control information using the first uplink channel.

In a case where a plurality of first uplink channels that do not overlap each other in the time domain and a second uplink channel having a lower priority than the first uplink channel overlap each other, the control section 210 may perform control to map uplink control information corresponding to the second uplink channel to at least one of the plurality of first uplink channels. The control section 210 may determine the first uplink channel used for transmission of the uplink control information on the basis of at least one of the transmission timing and the size of each of the plurality of first uplink channels. The control section 210 may split the uplink control information and map same to the plurality of first uplink channels. In a case where the second uplink channel is overlapping another second uplink channel that is not overlapping the plurality of first uplink channels, the control section 210 may perform control to use the other second uplink channel or the plurality of first uplink channels to transmit uplink control information corresponding to the other second uplink channel.

In a case where a first uplink channel and a plurality of second uplink channels that have a lower priority than the first uplink channel and that are not overlapping in the time domain overlap each other, the control section 210 may perform control to map at least one of the uplink control information corresponding to each of the plurality of second uplink channels to the first uplink channel. The control section 210 may combine the uplink control information corresponding to each of the plurality of second uplink channels, and then map the combined uplink control information to the first uplink channel. The control section 210 may determine the uplink control information to be mapped to the first uplink channel based on at least one of the type and the priority of the uplink control information corresponding to each of the plurality of second uplink channels. In a case where any of the plurality of second uplink channels is overlapping another second uplink channel that is not overlapping the first uplink channel, the control section 210 may perform control to use the other second uplink channel or the first uplink channel to transmit uplink control information corresponding to the other second uplink channel.

(Hardware Configuration)

Note that the block diagrams that have been used to describe the above embodiments illustrate blocks in functional units. These functional blocks (constituent parts) may be realized by arbitrary combinations of at least one of hardware and software. Further, the method for realizing each functional block is not particularly limited. That is, each functional block may be realized using a single apparatus obtained through physical or logical aggregation, or may be realized by directly or indirectly connecting two or more physically or logically separate apparatuses (in a wired manner, wirelessly, or the like, for example) and by using such apparatuses. The functional blocks may be realized by combining software with the above-described one apparatus or the above-described plurality of apparatuses.

Here, functions include, but are not limited to, discriminating, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (constituent parts) that has a transmission function may be referred to as a transmitting section, a transmitter, and the like. In any case, as described above, the realization method is not particularly limited.

Figure 19:
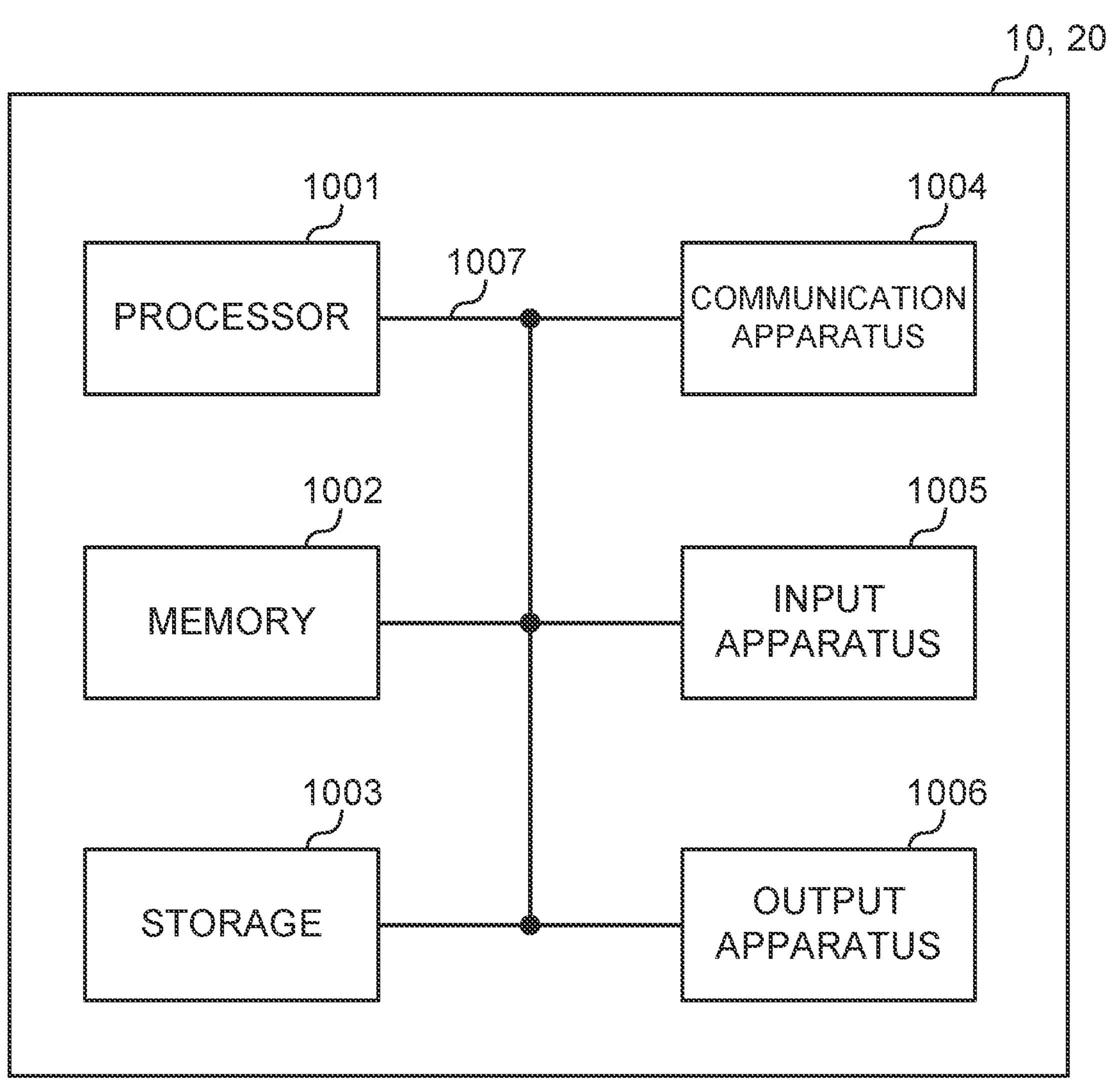
FIG. 19 is a diagram illustrating an example of a hardware configuration of a base station and a user terminal according to one embodiment.

For example, the base station, the user terminal, and the like according to one embodiment of the present disclosure may function as a computer that executes the processing of the radio communication method of the present disclosure. FIG. 19 is a diagram illustrating an example of a hardware configuration of the base station and the user terminal according to one embodiment. Physically, the above-described base station 10 and user terminal 20 may be constituted as a computer apparatus that includes a processor 1001, a memory 1002, a storage 1003, a communication apparatus 1004, an input apparatus 1005, an output apparatus 1006, a bus 1007, and the like.

Note that, in the present disclosure, terms such as apparatus, circuit, device, section, and unit are interchangeable. The hardware configuration of the base station 10 and the user terminal 20 may be constituted to include one or more of the apparatuses illustrated in the drawings, or may be constituted to not include some apparatuses.

For example, although only one processor 1001 is illustrated, a plurality of processors may be provided. Further, the processing may be executed by one processor, or the processing may be executed by two or more processors simultaneously or sequentially, or using other methods. Note that the processor 1001 may be implemented by one or more chips.

Each function of the base station 10 and the user terminal 20 is realized, for example, by a predetermined software (program) being read on hardware such as the processor 1001 and the memory 1002, by which the processor 1001 performs operations, controls communication via the communication apparatus 1004, and controls reading and/or writing of data in the memory 1002 and the storage 1003.

The processor 1001 may control the whole computer by, for example, running an operating system. The processor 1001 may be constituted by a central processing unit (CPU) that includes an interface with peripheral apparatuses, a control apparatus, an operation apparatus, a register, and the like. For example, at least part of the above-described control section 110 (210), transmitting/receiving section 120 (220), and the like may be realized by the processor 1001.

Further, the processor 1001 reads programs (program codes), software modules, data, and the like from the storage 1003 and/or the communication apparatus 1004 to the memory 1002, and executes various types of processing according to the programs, software modules, data, and the like. As the program, a program that causes a computer to execute at least part of the operation described in the above-described embodiment is used. For example, the control section 110 (210) may be constituted by a control program that is stored in the memory 1002 and that operates on the processor 1001, and other functional blocks may be similarly realized.

The memory 1002 is a computer-readable recording medium, and may include, for example, at least one of a Read-Only Memory (ROM), an Erasable Programmable ROM (EPROM), an Electrically EPROM (EEPROM), a Random Access Memory (RAM), or other appropriate storage media. The memory 1002 may be referred to as a "register," a "cache," a "main memory (primary storage apparatus)", and so on. The memory 1002 is capable of saving programs (program codes), software modules, and the like that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a Compact Disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmitting/receiving device) for performing inter-computer communication via a wired network and/or a wireless network, and is referred to as, for example, a network device, a network controller, a network card, a communication module, and so on. The communication apparatus 1004 may be constituted to include a high frequency switch, a duplexer, a filter, a frequency synthesizer, and the like in order to realize, for example, Frequency Division Duplex (FDD) and/or Time Division Duplex (TDD). For example, the transmitting/receiving section 120 (220), the transmitting/receiving antenna 130 (230), and the like described above may be realized by the communication apparatus 1004. The transmitting/receiving section 120 (220) may be implemented by being physically or logically separated into the transmitting section 120*a* (220*a*) and the receiving section 120*b* (220*b*).

The input apparatus 1005 is an input device for receiving inputs from the outside (for example, a keyboard, a mouse, a microphone, a switch, a button, a sensor, and the like). The output apparatus 1006 is an output device that performs outputs to the outside (for example, a display, a speaker, a light-emitting diode (LED) lamp, or the like). Note that the input apparatus 1005 and the output apparatus 1006 may be provided in an integrated configuration (for example, a touch panel).

Furthermore, apparatuses such as the processor 1001, the memory 1002 are connected by the bus 1007 so as to communicate information. The bus 1007 may be constituted using a single bus, or may be constituted by buses that vary between apparatuses.

Further, the base station 10 and the user terminal 20 may be constituted to include hardware such as a microprocessor, a Digital Signal Processor (DSP), an Application Specific Integrated Circuit (ASIC), a Programmable Logic Device (PLD), or a Field Programmable Gate Array (FPGA), and some or all of the functional blocks may be realized by using the hardware. For example, the processor 1001 may be implemented by using at least one of these pieces of hardware.

(Variations)

Note that terms described in the present disclosure and terms necessary for understanding the present disclosure may be replaced with terms that have the same or similar meanings. For example, channel, symbol, and signal (signal or signaling) are interchangeable. Further, the signal may be a message. A reference signal can be abbreviated as RS, and may also be referred to as a pilot, a pilot signal, and so on, depending on which standard applies. In addition, a Component Carrier (CC) may be referred to as a cell, a frequency carrier, a carrier frequency, and so on.

A radio frame may be constituted by one or more periods (frames) in the time domain. Each of the one or more periods (frames) included in the radio frame may be referred to as a subframe. Further, a subframe may be constituted by one or more slots in the time domain. The subframe may be a fixed time duration (for example, 1 ms) that is not dependent on numerology.

Here, the numerology may be a communication parameter used for transmission and/or reception of a certain signal or channel. For example, the numerology may indicate at least one of SubCarrier Spacing (SCS), a bandwidth, a symbol length, a cyclic prefix length, a Transmission Time Interval (TTI), the number of symbols per TTI, a radio frame configuration, specific filter processing performed by a transceiver in the frequency domain, or specific windowing processing performed by a transceiver in the time domain.

The slot may be constituted by one or more symbols in the time domain (Orthogonal Frequency Division Multiplexing (OFDM) symbols, Single Carrier Frequency Division Multiple Access (SC-FDMA) symbols, and the like). Further, a slot may be a time unit based on numerology.

A slot may include a plurality of mini slots. Each mini slot may be constituted by one or more symbols in the time domain. Further, a mini slot may be referred to as a subslot. A mini slot may by constituted by fewer symbols than a slot. A PDSCH (or PUSCH) transmitted in a time unit larger than a mini slot may be referred to as PDSCH (PUSCH) mapping type A. A PDSCH (or a PUSCH) transmitted using a mini slot may be referred to as PDSCH (PUSCH) mapping type B.

A radio frame, a subframe, a slot, a mini slot and a symbol all represent the time unit when a signal is being transmitted. The radio frame, the subframe, the slot, the mini slot, and the symbol may be called by other applicable names, respectively. Note that time units such as frame, subframe, slot, mini slot, and symbol in the present disclosure are interchangeable.

For example, one subframe may be referred to as a TTI, a plurality of consecutive subframes may be referred to as TTIs, or one slot or one mini slot may be referred to as a TTI. That is, the subframe and/or the TTI may be a subframe (1 ms) in the existing LTE, may be a period shorter than 1 ms (for example, one to thirteen symbols), or may be a period longer than 1 ms. Note that the unit representing the TTI may be referred to as a slot, a mini slot, and so on, instead of a subframe.

Here, a TTI refers to the minimum time unit of scheduling in radio communication, for example. For example, in a LTE system, a base station performs scheduling to allocate radio resources (a frequency bandwidth, transmit power, and the like that can be used in each user terminal) to each user terminal in TTI units. Note that the definition of TTI is not limited thereto.

The TTI may be a transmission time unit of a channel-coded data packet (transport block), a code block, a codeword, and the like, or may be a processing unit of scheduling, link adaptation, and so on. When the TTI is given, a time interval (for example, the number of symbols) to which a transport block, a code block, a codeword, or the like is actually mapped may be shorter than the TTI.

Note that, when one slot or one mini slot is referred to as a TTI, one or more TTIs (that is, one or more slots or one or more mini slots) may be the minimum time unit of scheduling. Also, the number of slots (the number of mini slots) constituting this minimum time unit for scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, and so on. A TTI that is shorter than a usual TTI may be referred to as a shortened TTI, a short TTI, a partial TTI (a partial TTI or a fractional TTI), a shortened subframe, a short subframe, a mini slot, a subslot, a slot, and so on.

Note that a long TTI (for example, a normal TTI, a subframe, and the like) is interchangeable with a TTI having a time duration exceeding 1 ms, and a short TTI (for example, a shortened TTI) is interchangeable with a TTI having a TTI duration less than the TTI duration of a long TTI and not less than 1 ms.

A Resource Block (RB) is the unit of resource allocation in the time domain and the frequency domain, and may include one or more contiguous subcarriers in the frequency domain. The number of subcarriers included in an RB may be the same regardless of the numerology, and may be twelve, for example. The number of subcarriers included in an RB may also be determined based on a numerology.

Further, an RB may include one or more symbols in the time domain, and may be one slot, one mini slot, one subframe or one TTI in length. One TTI, one subframe, and so on may each be constituted by one or more resource blocks.

Note that one or more RBs may be referred to as a physical resource block (Physical RB(PRB)), a Sub-Carrier Group (SCG), a Resource Element Group (REG), a PRB pair, an RB pair, and so on.

Furthermore, a resource block may be constituted by one or more Resource Elements (REs). For example, one RE may be a radio resource field of one subcarrier and one symbol.

A Bandwidth Part (BWP) (which may be referred to as a partial bandwidth or the like) may represent a subset of contiguous common resource blocks (RBs) for a certain numerology in a certain carrier. Here, a common RB may be specified by the index of the RB based on a common reference point of the carrier. PRBs may be defined by a certain BWP and numbered within the BWP.

The BWP may include a UL BWP (BWP for UL) and a DL BWP (BWP for DL). For the UE, one or more BWPs may be configured within one carrier.

At least one of the configured BWPs may be active, and it need not be assumed that the UE transmits/receives a predetermined signal/channel outside the active BWP. Note that "cell", "carrier", and so on in the present disclosure is interchangeable with "BWP".

Note that the structures of radio frames, subframes, slots, mini slots, symbols, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of Cyclic Prefix (CP), and the like can be variously changed.

Further, the information, parameters, and the like described in the present disclosure may be represented using absolute values, or may be represented using relative values with respect to given values, or may be represented using other corresponding information. For example, a radio resource may be instructed by a predetermined index.

The names used for parameters and the like in the present disclosure are in no respect limiting. Further, any mathematical expression or the like that uses these parameters may differ from those explicitly disclosed in the present disclosure. Because various channels (PUCCH, PDCCH, and the like) and information elements can be identified by any suitable names, various names allocated to these various channels and information elements are not restrictive names in any respect.

The information, signals, and the like described in the present disclosure may be represented using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination thereof.

In addition, information, signals, and the like can be outputted in a direction from a higher layer to a lower layer and/or a direction from a lower layer to a higher layer. Information, signals, and the like may be inputted and outputted via a plurality of network nodes.

The information, signals, and the like that are inputted may be saved in a specific location (for example, a memory), or may be managed using a management table. The information, signals, and the like which are inputted and outputted can be overwritten, updated, or appended. The outputted information, signals, and the like may be deleted. The information, signals, and the like that are inputted may also be transmitted to other apparatuses.

Notification of information may be performed, not only by using the aspects/embodiments described in the present disclosure, but also using another method. For example, the notification of information in the present disclosure may be performed by using physical layer signaling (for example, Downlink Control Information (DCI) or Uplink Control Information (UCI)), higher layer signaling (for example, Radio Resource Control (RRC) signaling, broadcast information (Master Information Block (MIB)), System Information Block (SIB), or the like), or Medium Access Control (MAC) signaling), another signal, or a combination thereof.

Note that the physical layer signaling may be referred to as Layer 1/Layer 2 (L1/L2) control information (L1/L2 control signal), L1 control information (L1 control signal), and so on. Further, the RRC signaling may be referred to as an RRC message, and may be, for example, an RRC Connection Setup message, an RRC Connection Reconfiguration message, and so on. Further, notification of the MAC signaling may be performed using, for example, a MAC Control Element (CE).

Also, the notification of predetermined information (for example, the notification of information to the effect that "X holds") does not necessarily have to be sent explicitly, and can be sent implicitly (for example, by not performing notification of this predetermined information, or by performing notification of another piece of information).

Judgments may be made using values represented by one bit (0 or 1), may be made using Boolean values that represent true or false, or may be made by comparing numerical values (for example, comparison against a given value).

Software, whether referred to as software, firmware, middleware, microcode, or hardware description language, or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, commands, information and so on may be transmitted and received via communication media. For example, when software is transmitted from a website, a server, or another remote source by using a wired technology (coaxial cable, optical fiber cable, twisted pair, Digital Subscriber Line (DSL), or the like) and/or a wireless technology (infrared rays, microwaves, and the like), the wired technology and/or the wireless technology is included within the definition of a transmission medium.

The terms "system" and "network" used in the present disclosure may be used interchangeably. "Network" may mean an apparatus (for example, a base station) included in the network.

In the present disclosure, terms such as "precoding," "precoder," "weight (precoding weight)," "Quasi-Co-Location (QCL)," "Transmission Configuration Indication state (TCI state)," "spatial relation," "spatial domain filter," "transmit power," "phase rotation," "antenna port," "antenna port group," "layer," "number of layers," "rank," "resource," "resource set," "resource group," "beam," "beam width," "beam angle," "antenna," "antenna element," and "panel" may be used interchangeably.

In the present disclosure, terms such as "Base Station (BS)," "radio base station," "fixed station," "NodeB," "eNB (eNodeB)," "gNB (gNodeB)," "access point," "Transmission Point (TP)," "Reception Point (RP)," "Transmission/Reception Point (TRP)," "panel," "cell," "sector," "cell group," "carrier," and "component carrier" may be used interchangeably. The base station is sometimes referred to using terms such as a macro cell, a small cell, a femto cell, or a pico cell.

The base station is capable of accommodating one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (Remote Radio Head (RRH))). The term "cell" or "sector" refers to a part or the whole of a coverage area of the base station and/or the base station subsystem that performs a communication service in this coverage.

In the present disclosure, terms such as "Mobile Station (MS)," "user terminal," "User Equipment(UE)," and "terminal" may be used interchangeably.

The mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable term.

The base station and/or the mobile station may be called a transmitting apparatus, a receiving apparatus, a wireless communication apparatus, and the like. Note that the base station and/or the mobile station may be a device mounted on a moving object, the moving object itself, or the like. The moving object may be a means of transportation (for example, a car, an airplane, or the like), an unmanned moving object (for example, a drone, an autonomous car, or the like), or a (manned or unmanned) robot. Note that the base station and/or the mobile station also includes an apparatus that does not necessarily move during a communication operation. For example, the base station and/or the mobile station may be an Internet of Things (IoT) device such as a sensor.

Further, base station in the present disclosure is interchangeable with user terminal. For example, each aspect/embodiment of the present disclosure may be applied to a configuration in which communication between the base station and the user terminal is replaced with communication between a plurality of user terminals (which may be referred to as, for example, Device-to-Device (D2D), Vehicle-to-Everything (V2X), and so on). In this case, the user terminal 20 may have the functions of the base station 10 described above. Further, terms such as "uplink" and "downlink" are interchangeable with terms corresponding to communication between terminals (for example, "side"). For example, uplink channel, downlink channel, and the like are interchangeable with side channel.

Likewise, user terminal in the present disclosure is interchangeable with base station. In this case, the base station 10 may have the functions of the user terminal 20 described above.

In the present disclosure, an operation performed by the base station may also be performed by an upper node thereof in some cases. In a network including one or more network nodes with base stations, it is clear that various operations performed for communication with a terminal can be performed by a base station, one or more network nodes (examples of which include but are not limited to Mobility Management Entity (MME) and Serving-Gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, the methods described in the present disclosure have presented various step elements using an exemplary order, and are not limited to the presented specific order.

Each aspect/embodiment described in the present disclosure may be applied to a system using Long-Term Evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (xG(x is, for example, an integer or decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next-generation system expanded on the basis of the foregoing, and the like. Further, a plurality of systems may be combined (for example, a combination of LTE or LTE-A and 5G, and the like) and applied.

The phrase "based on" as used in the present disclosure does not mean "based only on", unless otherwise specified. In other words, the phrase "based on" means both "based only on" and "based at least on."

All references to the elements using designations such as "first" and "second" as used in the present disclosure do not generally limit the amount or sequence of these elements. These designations can be used in the present disclosure as a convenient way of distinguishing between two or more elements. In this way, reference to the first and second elements does not imply that only two elements may be employed, or that the first element must precede the second element in some way.

The term "discriminating (determining)" as used in the present disclosure may include a wide variety of actions. For example, "discriminating (determining)" may be interpreted to mean "discriminating (determining)" actions such as judging, calculating, computing, processing, deriving, investigating, looking up (or searching or inquiring) (for example, looking up in a table, database, or another data structure), ascertaining, and the like.

Furthermore, "discriminating (determining)" may be interpreted to mean discriminating (determining) actions such as receiving (for example, receiving information), transmitting (for example, transmitting information), inputting, outputting, accessing (for example, accessing data in a memory), and so on.

In addition, "discriminating (determining)" may be interpreted to mean "discriminating (determining)" actions such as resolving, selecting, choosing, establishing, comparing, and so on. In other words, "discriminating (determining)" may be interpreted to mean discriminating (determining) some kind of action.

In addition, "discriminating (determining)" is interchangeable with "assuming", "expecting", "considering", and so on.

The "maximum transmit power" described in the present disclosure may mean the maximum value of the transmit power, the nominal UE maximum transmit power, or the rated UE maximum transmit power.

The terms "connected" and "coupled" used in the present disclosure, or any variation of these terms mean all direct or indirect connections or couplings between two or more elements, and may include the presence of one or more intermediate elements between two elements that are "connected" or "coupled" to each other. The coupling or connection between the elements may be physical, logical, or a combination thereof. For example, "connection" is interchangeable with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the phrase "A and B are different" may mean "A and B are different from each other". Note that this phrase may mean that "A and B are different from C." Terms such as "separate", "coupled", and the like may also be interpreted similarly to "different".

When "include," "including," and variations of these terms are used in the present disclosure, these terms are intended to be inclusive similarly to the term "comprising." Moreover, the term "or" used in the present disclosure is intended to be not an exclusive-OR.

In the present disclosure, when articles are added in translation, as in, for example, "a," "an," and "the" in English, the present disclosure may incorporate the fact that the nouns following these articles are plural.

The invention according to the present disclosure has been described in detail hereinabove; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

The invention claimed is:

1. A terminal comprising:

a processor that, when first uplink control information (UCI) with a first priority overlaps with multiple second UCIs with a second priority that is lower than the first priority, determines, based on types of the multiple second UCIs, at least one of the multiple second UCIs that is multiplexed with a first physical uplink control channel (PUCCH) corresponding to the first UCI; and a transmitter that transmits the determined at least one of the multiple second UCIs by using the first PUCCH, wherein the multiple second UCIs are included in a second PUCCH, and wherein the transmitter does not transmit other second UCIs other than the determined at least one of the multiple second UCIs.

2. The terminal according to claim 1, wherein the processor controls to multiplex second UCIs whose UCI type is Hybrid Automatic Repeat request ACKnowledgement (HARQ-ACK), among the multiple second UCIs, with the first PUCCH, and controls to drop a second UCI whose UCI type is Channel State Information (CSI), among the multiple second UCIs.

3. A radio communication method for a terminal, comprising:

when first uplink control information (UCI) with a first priority overlaps with multiple second UCIs with a second priority that is lower than the first priority, determining, based on types of the multiple second UCIs, at least one of the multiple second UCIs that is multiplexed with a first physical uplink control channel (PUCCH) corresponding to the first UCI; and transmitting the determined at least one of the multiple second UCIs by using the first PUCCH, wherein the multiple second UCIs are included in a second PUCCH, and wherein the terminal does not transmit other second UCIs other than the determined at least one of the multiple second UCIs.

4. A base station comprising:

a processor that, when first uplink control information (UCI) with a first priority overlaps with multiple second UCIs with a second priority that is lower than the first priority, determines, based on types of the multiple second UCIs, at least one of the multiple second UCIs that is multiplexed with a first physical uplink control channel (PUCCH) corresponding to the first UCI by a terminal; and a receiver that receives the determined at least one of the multiple second UCIs by using the first PUCCH, wherein the multiple second UCIs are included in a second PUCCH, and wherein the receiver does not receive other second UCIs other than the determined at least one of the multiple second UCIs.

5. A system comprising a terminal and a base station, wherein the terminal comprises:

a processor that, when first uplink control information (UCI) with a first priority overlaps with multiple second UCIs with a second priority that is lower than the first priority, determines, based on types of the multiple second UCIs, at least one of the multiple second UCIs that is multiplexed with a first physical uplink control channel (PUCCH) corresponding to the first UCI; and a transmitter that transmits the determined at least one of the multiple second UCIs by using the first PUCCH, wherein the multiple second UCIs are included in a second PUCCH, and wherein the transmitter does not transmit other second UCIs other than the determined at least one of the multiple second UCIs, and the base station comprises:

a receiver that receives the first PUCCH.

* * * * *